United States Patent
Kimura et al.

(10) Patent No.: US 9,361,259 B2
(45) Date of Patent: Jun. 7, 2016

(54) INTEGRATED CIRCUIT WITH MULTIPURPOSE PROCESSING AND FOR VIDEO/AUDIO PROCESSING OPTIMIZATION

(71) Applicant: PANASONIC CORPORATION, Osaka (JP)

(72) Inventors: Kozo Kimura, Osaka (JP); Tokuzo Kiyohara, Osaka (JP); Hiroshi Mizuno, Osaka (JP); Junji Michiyama, Osaka (JP); Tomohiko Kitamura, Osaka (JP); Ryoji Yamaguchi, Kyoto (JP); Manabu Kuroda, Hyogo (JP); Nobuhiko Yamada, Aichi (JP); Hideyuki Ohgose, Osaka (JP); Akifumi Yamana, Hyogo (JP)

(73) Assignee: SOCIONEXT INC., Kanagawa (JP)

(*) Notice: Subject to any disclaimer, the term of this patent is extended or adjusted under 35 U.S.C. 154(b) by 0 days.

(21) Appl. No.: 14/314,435

(22) Filed: Jun. 25, 2014

(65) Prior Publication Data

US 2014/0310442 A1    Oct. 16, 2014

Related U.S. Application Data

(63) Continuation of application No. 10/599,494, filed as application No. PCT/JP2005/006490 on Apr. 1, 2005, now Pat. No. 8,811,470.

(30) Foreign Application Priority Data

Apr. 1, 2004 (JP) .................................. 2004/108970

(51) Int. Cl.
*H04N 7/12* (2006.01)
*G06F 13/40* (2006.01)
(Continued)

(52) U.S. Cl.
CPC ............ *G06F 13/4027* (2013.01); *H04N 5/775* (2013.01); *H04N 5/781* (2013.01); *H04N 5/85* (2013.01); *H04N 5/907* (2013.01); *H04N 9/7921* (2013.01); *H04N 9/8042* (2013.01)

(58) Field of Classification Search
CPC .................................................. G06F 13/4027
USPC ....................................................... 375/240.01
See application file for complete search history.

(56) References Cited

U.S. PATENT DOCUMENTS

| 5,797,028 A | 8/1998 | Gulick et al. |
| 5,959,689 A | 9/1999 | DeLange et al. |

(Continued)

FOREIGN PATENT DOCUMENTS

| EP | 1102169 | 5/2001 |
| EP | 1102169 | 5/2004 |

(Continued)

OTHER PUBLICATIONS

Office Action dated Jul. 3, 2012 corresponding to Japanese Application 2010-048833.

(Continued)

*Primary Examiner* — Richard Torrente
(74) *Attorney, Agent, or Firm* — Greenblum & Bernstein, P.L.C.

(57) ABSTRACT

An integrated circuit for video/audio processing in which design resources obtained by development of video/audio devices can also be used for other types of video/audio devices. The integrated circuit includes a microcomputer that includes a CPU, a stream input/output for inputting/outputting a video and audio stream to and from an external device, a media processor that executes the media processing including at least one of compressing and decompressing the video and audio stream inputted to the stream input/output, an AV input/output that converts the video and audio stream subjected to the media processing by the media processor into video and audio signals and outputting these signals to the external device. A memory interface controls a data transfer between the microcomputer, the stream input/output, the media processor and the AV input/output and an external memory.

4 Claims, 16 Drawing Sheets

(51) Int. Cl.
*H04N 5/775* (2006.01)
*H04N 5/781* (2006.01)
*H04N 5/85* (2006.01)
*H04N 5/907* (2006.01)
*H04N 9/79* (2006.01)
*H04N 9/804* (2006.01)

(56) References Cited

U.S. PATENT DOCUMENTS

| | | | |
|---|---|---|---|
| 5,977,997 | A | 11/1999 | Vainsencher |
| 6,041,400 | A | 3/2000 | Ozcelik et al. |
| 6,240,516 | B1 | 5/2001 | Vainsencher |
| 6,384,832 | B1 | 5/2002 | Muramatsu et al. |
| 6,693,640 | B2 | 2/2004 | Muramatsu et al. |
| 6,804,742 | B1 | 10/2004 | Kitamura et al. |
| 7,000,039 | B2 | 2/2006 | Ishibashi |
| 7,032,046 | B2 | 4/2006 | Horii et al. |
| 7,321,368 | B2 | 1/2008 | Owen et al. |
| 7,403,564 | B2 | 7/2008 | Laksono |
| 2001/0040580 | A1 | 11/2001 | Margulis |
| 2002/0023237 | A1 | 2/2002 | Yamada et al. |
| 2002/0118203 | A1 | 8/2002 | Muramatsu et al. |
| 2002/0156953 | A1 | 10/2002 | Beiley et al. |
| 2002/0180743 | A1* | 12/2002 | Owen ............... G06F 13/1605 345/541 |
| 2003/0152148 | A1 | 8/2003 | Laksono |
| 2003/0222877 | A1 | 12/2003 | Tanaka et al. |
| 2004/0030844 | A1 | 2/2004 | Tojima et al. |
| 2004/0073730 | A1 | 4/2004 | Horii et al. |
| 2004/0073948 | A1 | 4/2004 | Ishibashi |
| 2004/0079952 | A1 | 4/2004 | Yamazaki et al. |
| 2005/0053028 | A1 | 3/2005 | Smith et al. |
| 2005/0235134 | A1* | 10/2005 | O'Sullivan ............ G06F 9/3004 712/10 |

FOREIGN PATENT DOCUMENTS

| | | |
|---|---|---|
| JP | 62-145458 | 6/1987 |
| JP | 10-506492 | 6/1998 |
| JP | 10-275135 | 10/1998 |
| JP | 11-250228 | 9/1999 |
| JP | 2001-142869 | 5/2001 |
| JP | 2002-528825 | 9/2002 |
| JP | 2004-005287 | 1/2004 |
| JP | 2004-056228 | 2/2004 |
| JP | 2004-246862 | 9/2004 |
| JP | 2005-510981 | 4/2005 |
| WO | 97/04401 | 2/1997 |
| WO | 00/25250 | 5/2000 |
| WO | 03/047265 | 6/2003 |

OTHER PUBLICATIONS

Japanese Office Action, mail date Feb. 15, 2011.
Kuroda et al., "Multimedia Processors", Proceedings of the IEEE, IEEE, New York, US, vol. 86, No. 6, Jun. 1, 1998, XP011044031.
Slavenburg, G: "TriMedia TM-1000; Preliminary data book", Internet Citation, Mar. 24, 1997, XP002372225, Retrieved from the Internet: URL: http://www.semiconductors.philips.com/acrobat_download/other/tm1000.pdf>, retrieved on Mar. 13, 2006.
Uehara et al., "DTV Global Platform no Kaihatsu" (Development of a DTV Global Platform), Matsushita Technical Journal, Feb. 18, 2004, vol. 50, No. 1, pp. 2-6, together with an English language translation of same.
Kimura et al., "Software deno Jitsujikan Shori o Jitsugen shita Minseiyo Shori Processor 'Media Core Processor'" (Media Processor for Multimedia Consumer Products 'Media Core Processor'), Matsushita Technical Journal, Apr. 18, 1999, vol. 45, No. 2, pp. 99-106, together with an English language translation of same.
Texas Instruments Incorporated, "TMS320DM642, Video/Imaging Fixed-Point Digital Signal Processor," p. 4.
Kuroda et al., "Multimedia Processors", Proceedings of the IEEE, IEEE, New York, US, vol.86, No. 6, Jun. 1, 1998, XP011044031.

* cited by examiner

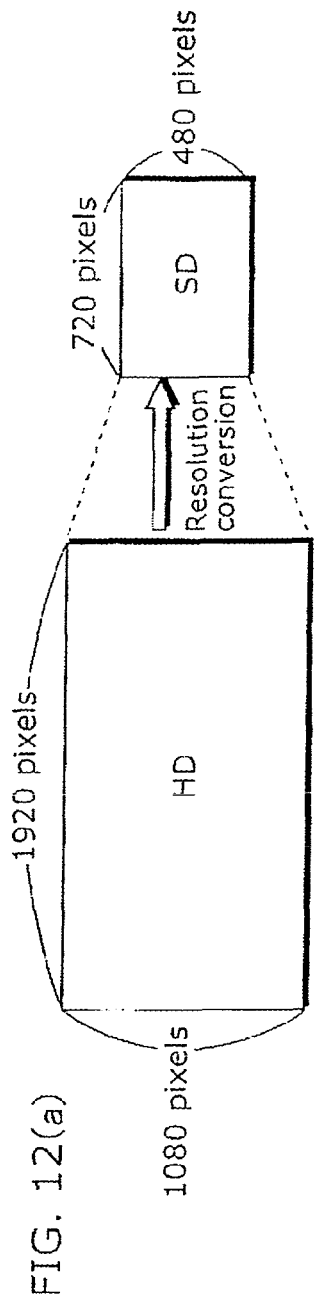
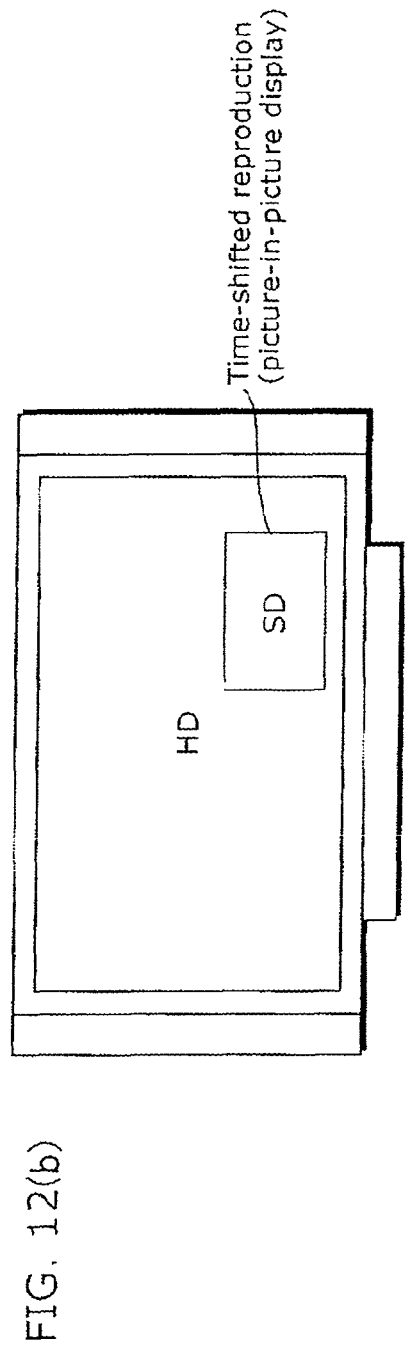
FIG. 12(a)
FIG. 12(b)

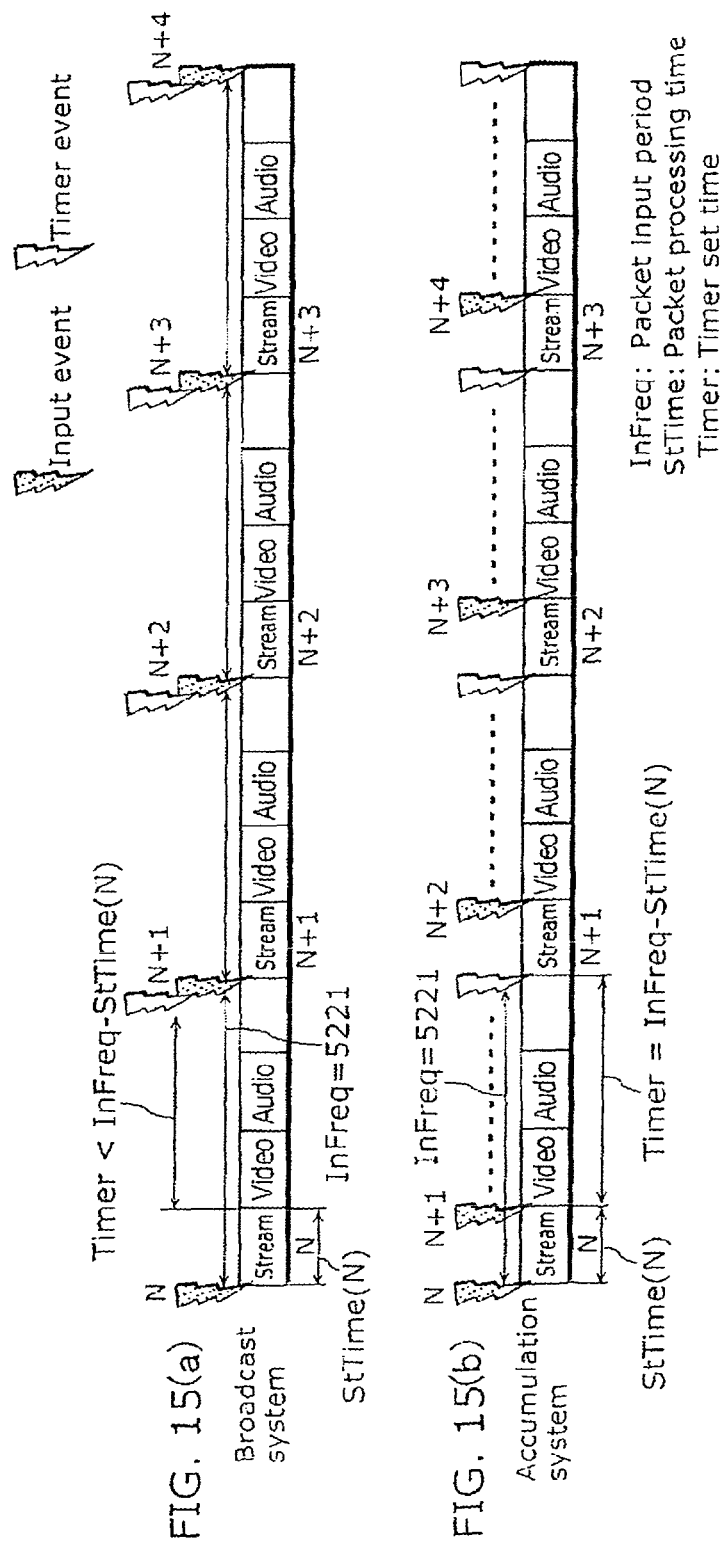

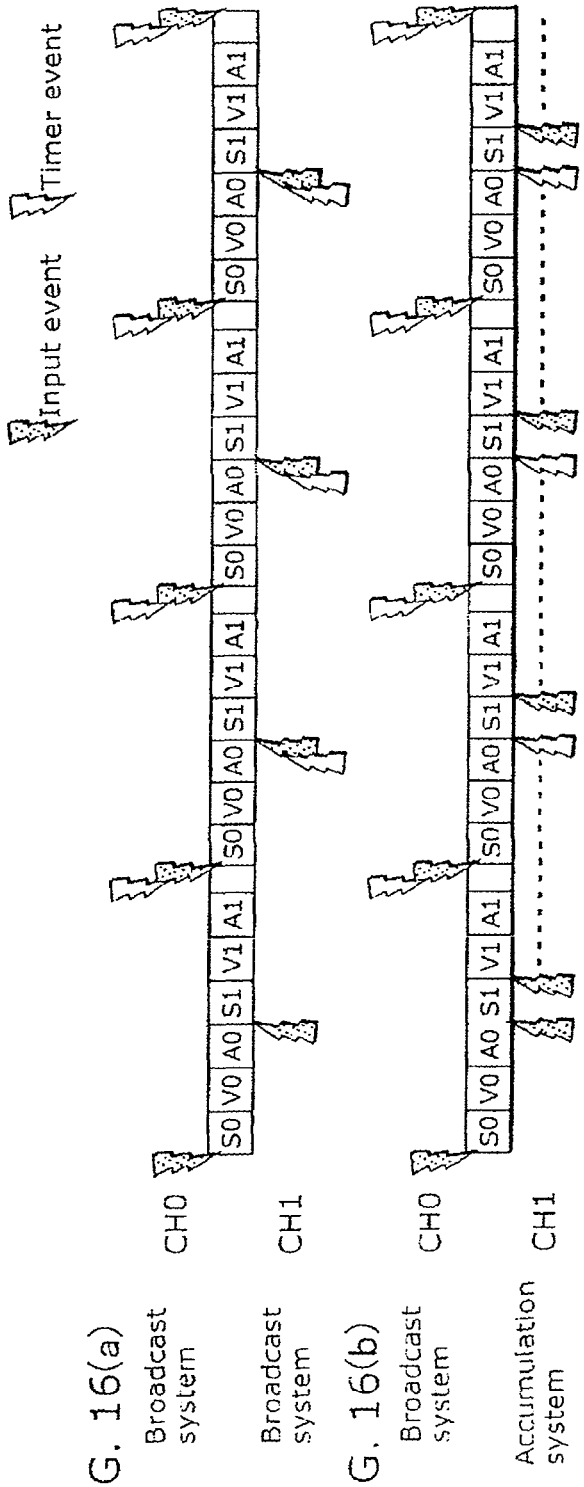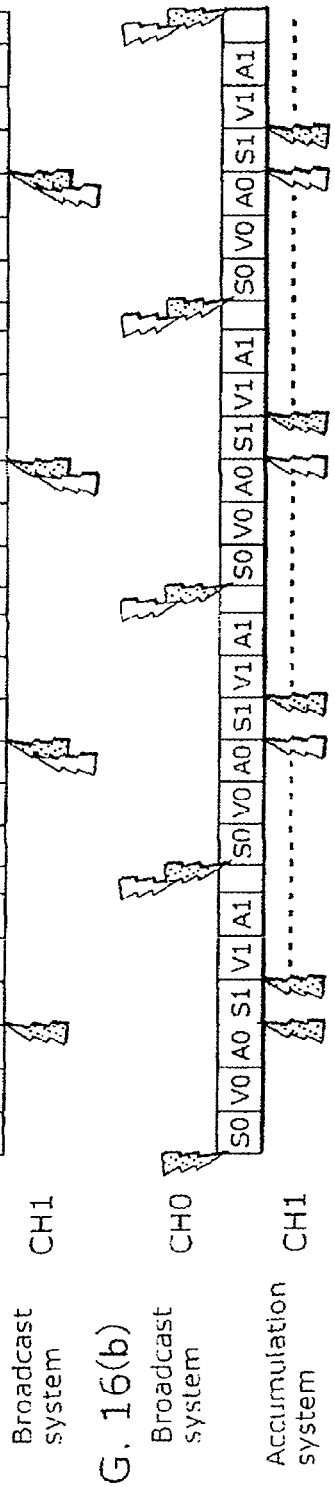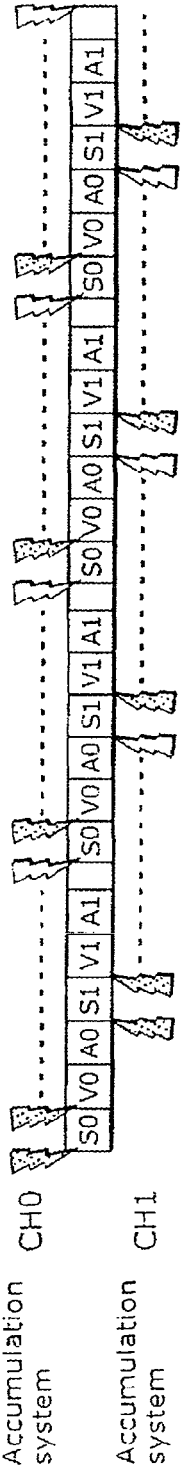

INTEGRATED CIRCUIT WITH MULTIPURPOSE PROCESSING AND FOR VIDEO/AUDIO PROCESSING OPTIMIZATION

CLAIM FOR PRIORITY

This application is a continuation of, and claims priority to, U.S. application Ser. No. 10/599,494, filed May 29, 2007, which is a 371 application of PCT/JP2005/006490, filed Apr. 1, 2005, the disclosures of which, including the specifications, drawings, and claims, are incorporated herein by reference in their entirety.

TECHNICAL FIELD

The present disclosure relates to an integrated circuit for video/audio processing, and particularly to an integrated circuit for video/audio processing implemented as a system LSI used for various applications.

BACKGROUND ART

With the rapid progress of digital techniques and compression/decompression techniques for moving images and audio, demand for higher functions and smaller size of video/audio devices such as digital TVs (DTV), digital video recorders (DVR) such as DVD recorders, cellular telephones, and video cameras has recently increased more and more. In the development field of these devices, therefore, shortening the lead time has become a great subject to tackle.

A conventional technique is available in which in order to support the development of the video/audio devices, one of plural function blocks required for processing the video/audio functions is realized as an LSI (for example, see Non-Patent Reference 1).

This conventional LSI includes a digital signal processor (DSP) core required for media processing, various video I/Os, an RGB I/O, an MPEG-2 transport stream I/F, and a LAN I/F. Using these LSIs, the device developer is not required to develop an individual hardware circuit in each function block required for video/audio processing.

Non-Patent Document 1: "TMS320DM642 Technical Overview" Texas Instruments Incorporated, pg. 4, etc.

PROBLEMS THAT DISCLOSURE IS TO SOLVE

The aforementioned conventional LSI, however, lacks an I/F with the telephone using the voice, etc. and the function to reduce the power consumption such as power control, and thus poses the problem that it is not suitable for mobile applications such as cellular telephones and video cameras. Even in the case where the server devices such as DTV are implemented using the conventional LSI, therefore, the design resources such as software obtained by the implementation is not applicable to the mobile devices such as the portable telephone.

Further, in the case where a video/audio device is developed using the conventional LSI, the interface between a memory for temporarily storing video and audio data and various processing blocks is required to be designed by the developer individually. To incorporate a common memory that can be shared by various processing blocks, for example, the transfer band between each processing block and the memory is required to be secured while at the same time taking the latency guarantee into consideration. For this reason, the development steps for highly functional video/audio devices cannot be actually reduced.

The present disclosure has been developed in view of these problems with the background art, and an object of the present disclosure is to provide an integrated circuit for video/audio processing which is applicable as a system LSI for mobile video/audio devices such as cellular telephones and digital cameras, as well as the server video/audio devices such as DTVs and DVRs, and in which the design resources acquired through the development of these video/audio devices can be utilized for other types of video/audio devices.

Another object of the present disclosure is to provide an integrated circuit for video/audio processing in which the transfer band of the interface between the memory for holding the video and audio data and each processing block, and the latency guarantee, can be easily secured.

MEANS TO SOLVE THE PROBLEMS

In order to achieve the objects described above, according to the present disclosure, there is provided an integrated circuit for video/audio processing for processing video and audio signals, characterized by including a microcomputer block including a CPU, a stream input/output block for inputting/outputting the video and audio streams to and from external devices under the control of the microcomputer block, a media processing block for executing the media processing including at least one of the compression and decompression of the video and audio streams inputted to the stream input/output block or outputted from the stream input/output block under the control of the microcomputer block, an AV input/output block for converting the video and audio streams subjected to media processing by the media processing block into video and audio signals and outputting them to an external device or acquiring video and audio signals from the external device and converting them to the video and audio streams to be subjected to media processing by the media processing block under the control of the microcomputer block, and a memory interface block for controlling the data transfer between the microcomputer block, the stream input/output block, the media processing block and the AV input/output block and the memory under the control of the microcomputer block.

As a result, for example, the microcomputer block, the stream input/output block, the media processing block and the AV input/output block are connected to the memory interface block by a dedicated data bus, and the video and audio streams are exchanged, through the memory, among the microcomputer block, the stream input/output block, the media processing block and the AV input/output block. In this way, the four types of the individual processing blocks are connected not mutually but through a common memory. The control programming for each processing block, therefore, is satisfactorily designed to input and output data to and from the memory, and separated from the processing for the other processing blocks. As a result, the independence of the application program for each processing block is improved and the utilization of the design resources for other applications is made possible.

In this case, the memory interface block may relay the data transfer in such a manner that the data are transferred in parallel between the microcomputer block, the stream input/output block, the media processing block and the AV input/output block and the memory, or the microcomputer block, the stream input/output block, the media processing block and the AV input/output block may notify the other blocks after storing the video and audio streams in the memory. As a result, the memory is shared by the processing blocks through the memory interface block, and by concentrating the data transfer, the arbitration control and the management process in the memory interface block, the transfer band and the latency guarantee can be secured easily in the interface between the memory and each processing block.

Also, the stream input/output block may include, for example, an interface unit operable to transmit and receive the video and audio streams to and from the external device, an encryption processing unit operable to encrypt and decrypt the video and audio streams transmitted and received and a direct memory access control unit operable to control the data transfer between the external device and the memory. The media processing block may include, for example, an instruction parallel processor for executing plural signal processing instructions in parallel, an accelerator for executing the arithmetic process, and a direct memory access control unit to operable to control the data transfer to and from the memory. The AV input/output block may include, for example, a graphics engine for performing the graphic processing of the video data and a format conversion unit for converting the format of the video signal. The memory interface block may include, for example, plural ports connected with the microcomputer block, the stream input/output block, the media processing block and the AV input/output block and a memory scheduler for adjusting the timing of data transfer in each of the plurality of the ports.

Further, as a mobile application, the microcomputer block preferably includes at least one of a clock control unit to operable to turn on/off the clock supply to the CPU and a power supply control unit to operable to turn on/off the power supply.

Also, as a server application, the media processing block may preferably further include a data parallel processor for executing the arithmetic operation on plural data in parallel.

Also, the integrated circuit for video/audio processing may further include a signal line for connecting the stream input/output block and the media processing block, and the media processing block may execute the media processing of the video and audio streams inputted from the stream input/output block through the signal line or outputted to the stream input/output block through the signal line. In the case where the stream data sent from the stream input/output block is low in bit rate, the media processing block operating at high speed better receives the stream data directly and executes the media processing without the intermediary of the memory. Thus, the security can be improved, the power consumption reduced and the processing efficiency improved correspondingly.

Also, as a specific application, the integrated circuit for video/audio processing is used as a system LSI for plural different devices, which include the digital camera, the digital video recorder, the video camera and the portable telephone.

In the case where one of the devices described above is designated as a first device and another one as a second device, the instruction set of the CPU or the media processor may have a compatibility, or the core of the media processor or the CPU may have a common soft macro or a common hard macro or a common memory map.

Also, the AV input/output block may further generate a recording video signal by converting the resolution of the video signal converted from the video stream subjected to media processing in the media processing block or acquired from an external device, while at the same time generating the field feature information indicating at least one of the in-field total or inter-field difference of the video field expressed by the recording video signal. The media processing block may further convert the recording video signal to the recording video stream by accessing the field feature information.

Also, preferably, the integrated circuit for video/audio processing may further include a signal line for connecting the media processing block and the AV input/output block, and the field feature information may be transmitted and received to and from the media processing block and the AV input/output block through the signal line.

With this configuration, the media processing block can determine the I picture for compression of the recorded image and adjust the compression ratio dynamically by referring to the field feature information known in the AV input/output block. As a result, the integrated circuit for video/audio processing can achieve a satisfactory tradeoff between the image quality and the data amount while maintaining a high speed performance without duplicating the cost for acquiring the field feature information.

Also, the media processing block, with regard to one video/audio multiplex stream, may execute, by time division, the processes of multiplexing or demultiplexing of the stream, the compression or decompression of the video data and the compression or decompression of the audio data, while at the same time prohibiting plural activations of the process of multiplexing or demultiplexing the stream within a predetermined time.

Also, preferably, the media processing block may include a virtual multiprocessor functioning as plural logical processors by time division, so that the processes of multiplexing or demultiplexing the stream and compressing or decompressing the video data and the audio data may be executed by different logical processors implemented by the virtual multiprocessor, while the logical processor for multiplexing or demultiplexing the stream may sleep until the expiry of the time on a predetermined timer after finishing the processing of predetermined number of units of the stream.

With this configuration, the excessive execution of the stream processing is autonomously suppressed without regard to the broadcast system or the accumulation system to which streams may be excessively inputted. Therefore, not only the failure of the video/audio processing can be prevented but also the requirement for the management of the upper limit of the stream amount sent to the media processing block in the stream input/output block is eliminated. As an overall result, the independence and simplicity of the application program for each processing block are improved, thereby contributing to the promotion of the utilization of the design resources.

Note that the present disclosure can be implemented not only as the aforementioned system LSI but also as a design development method for a device using the system LSI. Specifically, assume that a given one of the devices including the digital TV, the digital video recorder, the video camera and the portable telephone is defined as a first device and another one of them as a second device and a given process is shared by the integrated circuit for video/audio processing for the first device and the integrated circuit for video/audio processing for the second device. Then, a method of design and development can be implemented in which the particular process, if executed by the microcomputer block of the integrated circuit for video/audio processing for the first device, is executed by the microcomputer block of the integrated circuit for video/audio processing of the second device, the process, if executed by the stream input/output block of the integrated circuit for video/audio processing for the first device, is executed by the stream input/output block of the integrated circuit for video/audio processing of the second device, the process, if executed by the media processing block of the integrated circuit for video/audio processing for the first device, is executed by the media processing block of the integrated circuit for video/audio processing for the second device, and the process, if executed by the AV input/output block of the integrated circuit for video/audio processing for the first device, is executed by the AV input/output block of the integrated circuit for video/audio processing for the second device.

Effects of the Disclosure

According to the present disclosure, mobile video/audio devices such as cellular telephones and video cameras as well as server video/audio devices such as DTVs or DVRs can be implemented using a common system LSI, and the shared utilization of the design resources is made possible among these video/audio devices.

Also, the transfer band and the latency guarantee can be easily secured in the interface between the memory for holding the video and audio data and each processing block, and high-function video/audio devices can be developed within a short period of time.

As described above, the present disclosure can shorten the lead time of the video/audio devices and has a very high practical value at the present time when the video/audio processing for the video/audio devices having the performance higher than ever before is in demand.

BRIEF DESCRIPTION OF DRAWINGS

FIGS. 12(a) and 12(b) are diagrams showing the contents of the process executed by each processing block in the operation shown in FIG. 10.

FIGS. 15(a) and 15(b) are diagrams showing the timing of assignment of the virtual processor in the operation shown in FIG. 14.

FIGS. 16(a) to 16(c) are diagrams showing the timing of assigning the virtual processor for processing two streams.

Figure 1:
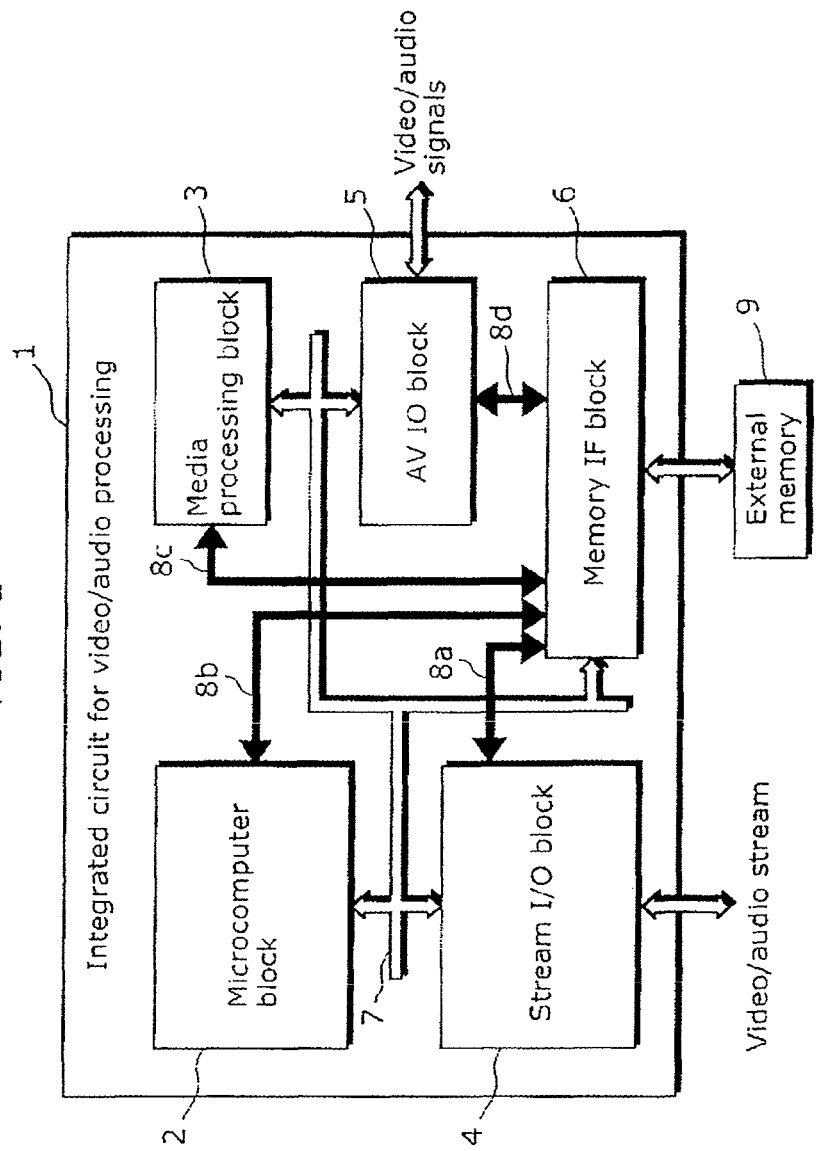
FIG. 1 is a function block diagram showing a basic configuration of an integrated circuit for video/audio processing according to the present disclosure.

NUMERICAL REFERENCES 1, 100, 100a, 200, 200a: Integrated circuit for video/audio processing
1a: Semiconductor substrate
1b: Circuit layer
1c: Lower wiring layer
1d: Upper wiring layer
2, 10, 210: Microcomputer block
3, 20, 220: Media processing block
4, 30, 230: Stream I/O block
5, 40, 240: AV IO block
6, 50, 250: Memory IF block
7, 60: Control bus
8a to 8d, 71 to 75: Data bus
9: External memory
11: DMA unit
12: CPU unit
13: Peripheral unit of microcomputer
14: Clock control unit
15: Power supply control unit
21: Instruction parallel processor
21a: Virtual multiprocessor
22: Sequencer unit
23 to 26: Accelerator unit
27: DMAC unit
28: Stream processing suppression timer
32: Encryption engine unit
33: Secure management unit
34: DMAC unit
35: Stream processing unit
36: Device IF unit
41: Graphics engine unit
42: Video input format conversion unit
43: Imaging process engine unit
44: Audio IF unit
45: Video output format conversion unit
51: Memory scheduler
51a to 51c: Subsystem IF
52: Buffer unit
53: Built-in RAM
101: Flash memory
102: Another CPU
102 to 104: External device
103: Memory card
104: PDA
105: High-speed IF
106: SDRAM
107: LCD
108: Digital camera
201: External master
202: TV tuner
203: Ethernet controller
205: USB
206: Hard disk
207: Optical disk
208: Differential IF
210, 211: External memory
212: Large-sized LCD
221: Data parallel processor
231: Stream processing unit
232: Device IF unit

BEST MODE FOR CARRYING OUT THE DISCLOSURE

An embodiment of the present disclosure is explained below with reference to the drawings.

FIG. 1 is a function block diagram showing a basic configuration of an integrated circuit for video/audio processing 1 according to the present disclosure. The integrated circuit for video/audio processing 1 according to the present disclosure, as described later, can be implemented as a circuit configuration suitable for mobile video/audio devices such as cellular telephones and video cameras or as a circuit configuration suitable for server video devices such as DTV and DVR by changing the circuit configuration to some degree. Nevertheless, the integrated circuit for video/audio processing 1 has an architecture shared by both applications, which is shown in this drawing.

This integrated circuit for video/audio processing 1 is a system LSI for performing various signal processing operations on a video/audio stream, and configured of a microcomputer block 2, a media processing block 3, a stream I/O block 4, a AV IO (audio-visual input/output) block 5 and a memory IF block 6.

The microcomputer block 2 is a processor for controlling the integrated circuit for video/audio processing 1 as a whole, and a circuit block for controlling the processing blocks 3 to 6 through a control bus 7 or accessing an external memory 9 through a data bus 8b and the memory IF block 6. This process is a non-real-time multipurpose (control-related) process not dependent on the video/audio output cycle (frame rate, etc.).

The stream I/O block 4 is a circuit block which, under the control of the microcomputer block 2, reads the stream data such as the compressed video/audio stream from the peripheral devices such as accumulation media or a network, and stores them in an external memory 9 through the data bus 8a and the memory IF block 6 or transfers the stream in the opposite direction. This process is a non-real-time IO process not dependent on the video/audio output cycle (frame rate, etc.).

The media processing block 3 is a circuit block which, under the control of the microcomputer block 2, reads the video/audio data such as the compressed video/audio streams from the external memory 9 through a data bus 8c and the memory IF block 6, and conducts the media processing such as compression or decompression, after which the processed video data and audio data are stored in the external memory 9 through the data bus 8c and the memory IF block 6. This process is a real-time multipurpose (media-related) process dependent on the video/audio output cycle (frame rate, etc.).

The AV IO block 5 is a circuit block which, under the control of the microcomputer block 2, reads the video data, the audio data and the like from the external memory 9 through a data bus 8d and the memory IF block 6, and after various graphic processing, outputs a video signal and an audio signal to an external display unit, speaker or the like or transfers data in the opposite direction. This process is a real-time IO process dependent on the video/audio output cycle (frame rate, etc.).

The memory IF block 6 is a circuit block which, under the control of the microcomputer block 2, performs the control operation to make sure that data requests are made in parallel between the processing blocks 2 to 5 and the external memory 9. In the process, in response to the request from the microcomputer block 2, the transfer band between the processing blocks 2 to 5 and the external memory 9 is secured while at the same time making the latency guarantee.

As a result, each block including the media processing block 3 can secure the band width required for the functions to be provided, and the required access latency is guaranteed. Thus, the performance of the application and the real-time operation provided by a single block or collaborative operation of plural blocks can be successfully guaranteed.

Note that a typical example of the technique for securing the band width and guaranteeing the latency is disclosed in detail in Japanese Laid-Open Patent Application No. 2004-246862, and therefore not described in detail below.

As described above, the integrated circuit for video/audio processing 1 according to the present disclosure is configured of four unique processing blocks 2 to 5 defined by a combination between the real time characteristic and the processing type (JO processing/non-IO (multipurpose) processing). The processing blocks include a microcomputer block 2 for executing the non-real-time multipurpose process, a media processing block 3 for executing the real-time multipurpose process, a stream I/O block 4 for executing the non-real-time I/O process, and an AV IO block 5 for executing the real-time I/O process. In addition, the integrated circuit for video/audio processing 1 is configured of a memory IF block 6 connected to the four processing blocks 2 to 5 by dedicated data buses 8a to 8d, and thus has an architecture shared by the mobile applications and the server applications.

Specifically, the four types of the processing blocks are not connected mutually but through the common external memory 9. The control programming for each processing block, therefore, can be designed to input/output data to and from the external memory 9 separately from the process in the other processing blocks. As a result, the independence of the application program for each processing block is improved, and each processing block is not affected by the other processing blocks. Thus, the design is made possible simply by taking the specification between each processing block and the memory IF into consideration, thereby improving the design efficiency. At the same time, even in the case where other applications are developed, the particular other applications can be processed simply by changing the block configuration as required. Thus the utilization of the design resources for other applications is made possible.

For example, an application program for the integrated circuit for video/audio processing (such as an application program for decompressing, in the media processing block, the compressed audio stream received by the portable telephone) developed for incorporation into the mobile video/audio devices such as the portable telephone can be utilized as an application program for the integrated circuit for video/audio processing built in the server video/audio devices such as DTV (such as an application program for decompressing, in the media processing block, the audio stream included in the transport stream received by the DTV).

Specifically, assume that a given one of the devices including the DTV, the DVR, the video camera and the portable telephone is defined as a first device and another one of them as a second device and a given process is shared by the integrated circuit for video/audio processing for the first device and the integrated circuit for video/audio processing for the second device. Then, the design and development are made possible in such a manner that the particular process, if executed by the microcomputer block of the integrated circuit for video/audio processing for the first device, is executed by the microcomputer block of the integrated circuit for video/audio processing for the second device, the process, if executed by the stream I/O block of the integrated circuit for video/audio processing for the first device, is executed by the stream I/O block of the integrated circuit for video/audio processing for the second device, the process, if executed by the media processing block of the integrated circuit for video/audio processing for the first device, is executed by the media processing block of the integrated circuit for video/audio processing for the second device, and the process, if executed by the AV I/O block of the integrated circuit for video/audio processing for the first device, is executed by the AV I/O block of the integrated circuit for video/audio processing for the second device. In this way, the processing burden on each block of the integrated circuit for video/audio processing for the first device is shared with the processing burden on each block of the integrated circuit for video/audio processing for the second device, thereby making it possible to utilize the hardware and software design resources of each block.

Figure 2:
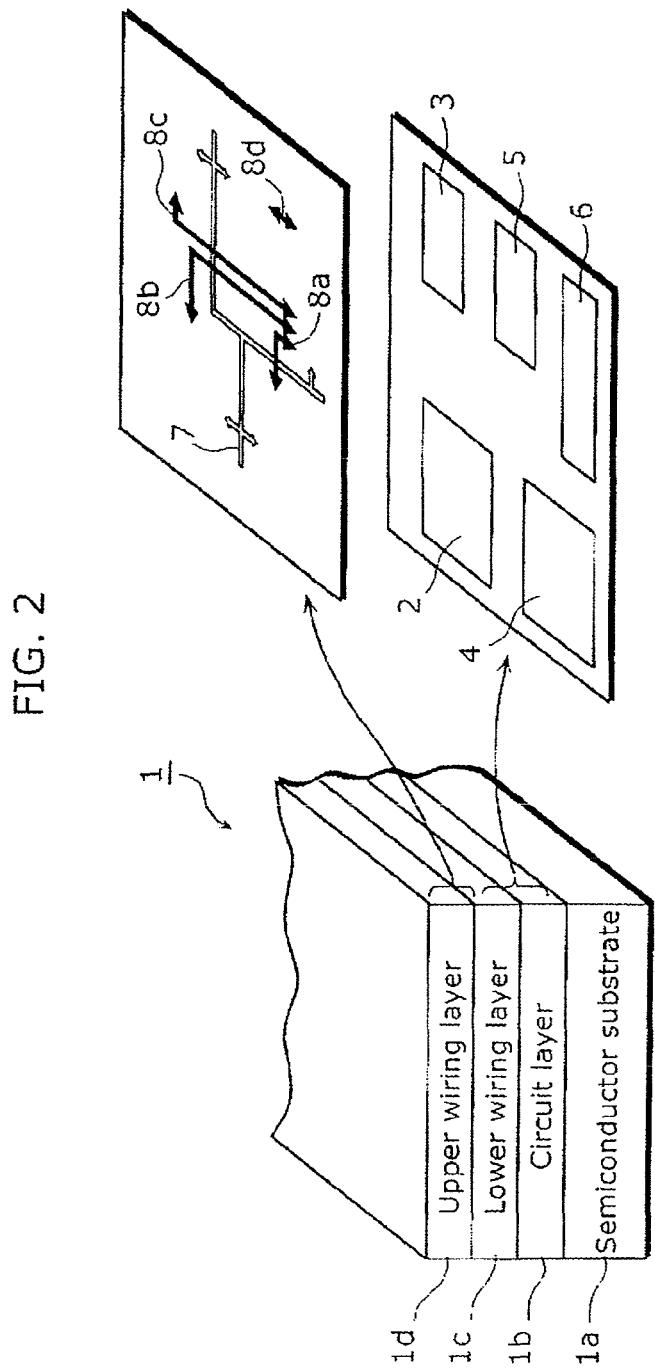
FIG. 2 is a diagram showing a configuration of the integrated circuit for video/audio processing.

Note that this integrated circuit for video/audio processing 1 is a one-chip LSI formed on a single semiconductor substrate, and as a configuration for the fabrication process, includes a semiconductor substrate 1a, a circuit layer 1b, a lower wiring layer 1c and an upper wiring layer 1d as shown in FIG. 2. The circuit layer 1b corresponds to the circuit elements of the processing blocks 2 to 5, the lower wiring layer 1c to the wires in the processing blocks 2 to 5 connecting the circuit elements of the processing blocks 2 to 5, and the upper wiring layer 1d to the buses (the control bus 7 and the data buses 8a to 8d) for connecting the processing blocks 2 to 5. In this way, the wiring layer is divided into the wires in the processing blocks and the wires connecting the processing blocks, and by using different mask layouts, the wiring design is separated between inside and outside of each processing block, thereby facilitating the design.

Next, among the integrated circuits for video/audio processing according to the present disclosure, the integrated circuit for video/audio processing of a type suitable for mobile applications such as the portable telephone and the video camera is explained in more detail.

Figure 3:
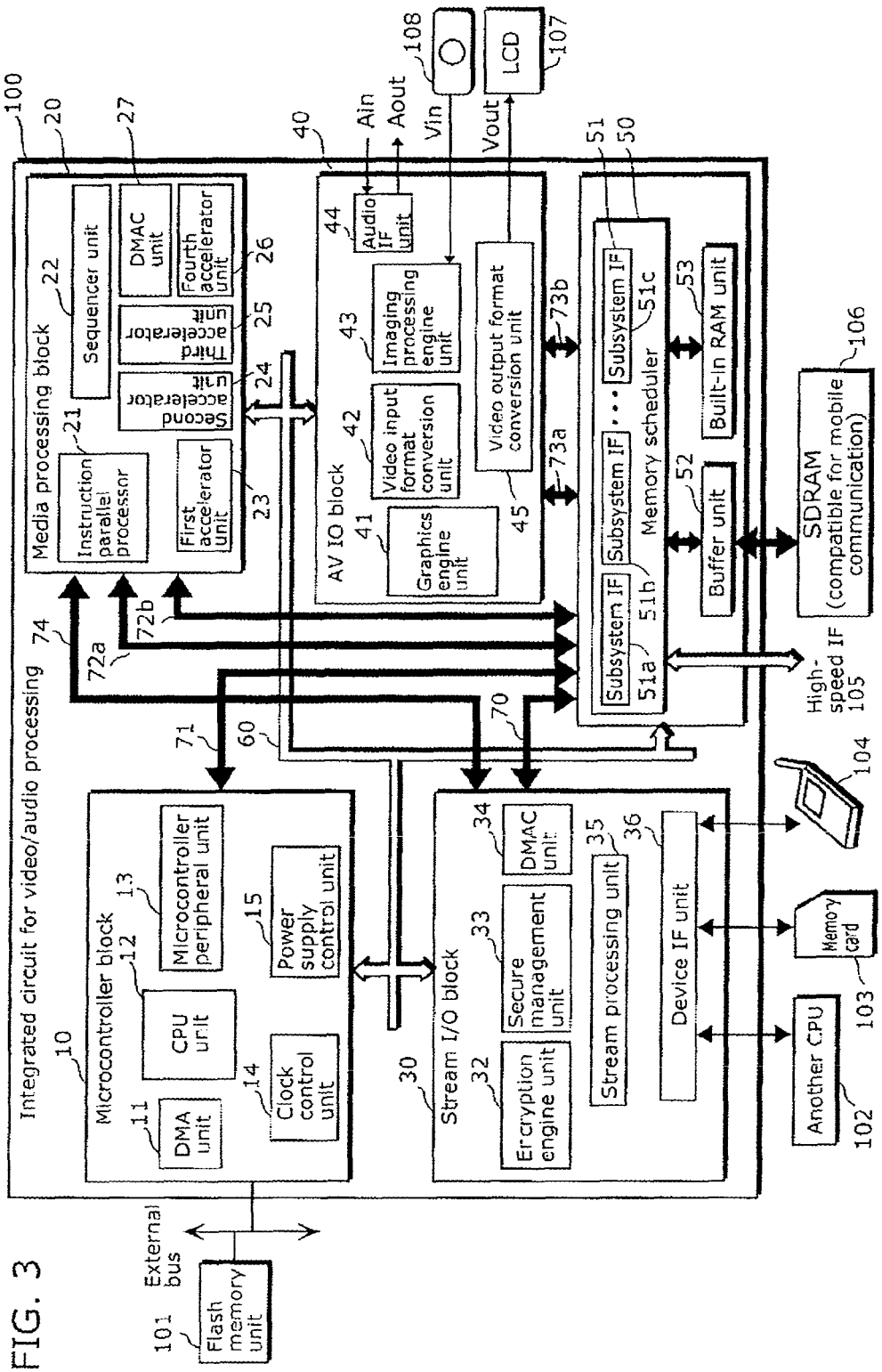
FIG. 3 is a function block diagram showing a detailed configuration of an integrated circuit for video/audio processing suitable for mobile applications.

FIG. 3 is a function block diagram showing a detailed configuration of an integrated circuit for video/audio processing 100 suitable for mobile applications.

The integrated circuit for video/audio processing 100 is a system LSI suitable for mobile video/audio devices requiring the functions of radio communication and low power consumption, and configured of a microcomputer block 10, a media processing block 20, a stream I/O block 30, an AV IO block 40 and a memory IF block 50.

The microcomputer block 10 is a circuit block for controlling the processing blocks 20 to 40 through the control bus 60 or accessing the SDRAM (synchronous DRAM) 106 through the data bus 71. The microcomputer block 10 includes a DMA (direct memory access) unit 11, a CPU unit 12, a microcomputer peripheral unit 13, a clock control unit 14 and a power supply control unit 15.

The DMA unit 11 is a controller for direct memory access, and downloads the user program, etc. stored in the flash memory 101 connected through an external bus, for example, by direct transfer to a program memory or the like in the CPU unit 12.

The CPU unit 12 is a processor core having the timer function and the interrupt function. In accordance with he program stored in the internal program memory or the like, the whole integrated circuit for video/audio processing 100 is controlled. Note that the basic software such as the OS is stored in the internal program memory or the like.

The microcomputer peripheral unit 13 is an interrupt control circuit or a peripheral I/O port.

The clock control unit 14 is a circuit which supplies the clock to each circuit and reduces the power consumption by, for example, stopping the clock supply to the CPU unit 12, etc. while in idle mode, etc.

The power supply control unit 15 is a circuit for supplying power to each circuit and reducing the power consumption by stopping power supply to the processing blocks in idle mode.

The media processing block 20 is, for example, a high-speed DSP for compressing/decompressing the video/audio/voice data read through the data buses 72a, 72b from the SDRAM 106 in accordance with the MPEG standard or the like under the control of the microcomputer block 10, and configured to include an instruction parallel processor 21, a sequencer unit 22, first to fourth accelerators (ACC) units 23 to 26 and a DMAC unit 27. This media processing block 20 can also receive the stream data directly through the data bus 74 from the stream I/O block 30 without the intermediary of the SDRAM 106. In the case where the stream data sent from the stream I/O block 30 is low in bit rate, the media processing block 20 operating at high speed better receives the stream data directly and executes the media processing. In this way, the security can be improved, the power consumption reduced and the processing efficiency improved by an amount corresponding to the bypassing of the SDRAM 106.

The instruction parallel processor 21 is a processor for executing plural instructions (signal processing instructions) in parallel and controls the whole of the component elements 22 to 27.

The sequencer unit 22 controls the processing sequence of the first to fourth accelerator units 23 to 26 under the control of the instruction parallel processor 21.

The first to fourth accelerator units 23 to 26 are arithmetic processing engines operating in parallel to each other to perform the media processing including the compression/decompression of the video/audio/voice data such as DCT (discrete cosine transform), inverse DCT, quantization, inverse quantization, motion detection and motion compensation.

The DMAC unit 27 is a controller for direct memory access and, for example, controls the direct data transfer to and from the SDRAM 106 through the data buses 72a, 72b, etc.

This media processing block 20 constitutes a low power consumption circuit for mobile applications. Specifically, the media processing block 20 is implemented by a dedicated hardware engine low in power consumption such as the first to fourth accelerator units 23 to 26 but not a multipurpose data processor high in power consumption, and has the function of automatically detecting and stopping the idle mode lacking the processing data (automatic stop control), etc and the function of cutting off the clock supply (gated clock).

The stream I/O block 30 is a circuit block for receiving the stream data from the external devices 102 to 104, stores the stream data in the SDRAM 106 through the data bus 70 or transferring the data in reverse direction, and configured to include an encryption engine unit 32, a security management unit 33, a DMAC unit 34, a stream processing unit 35 and a device IF unit 36.

The encryption engine unit 32 is an encryptor/decryptor for decrypting the inputted encrypted stream data, the key data and the like and encrypting the key data delivered to the external devices 102 to 104.

The security management unit 33 is a tamper resistant circuit for controlling, for example, the execution of the device authentication protocol required with the external devices 102 to 104 and holding a confidential key.

The DMAC unit 34 is a controller for direct memory access, and for example, directly transfers the stream data inputted through the device IF unit 36 to the SDRAM 106 through the data bus 70.

The stream processing unit 35 demultiplexes the stream data inputted from the external devices 102 to 104 through the device IF unit 36.

The device IF unit 36 is, for example, a collection of an JO port for transmitting and receiving signals to and from another CPU 102 such as a communication processor used with the portable telephone etc, an IO port for reading/writing the memory card 103 such as the SD (trademark) card, etc, and an IO port for infrared light communication with the PDA 104, etc.

The AV IO block 40 is a circuit block which reads the video and audio streams stored in the SDRAM 106, through the data buses 73a, 73b, and outputs them to the LCD 107, etc. and stores the imaging data sent from the digital camera 108 in the SDRAM 106 through the data buses 73a, 73b. The AV IO block 40 is configured to include a graphics engine unit 41, a video input format conversion unit 42, an imaging processing engine unit 43, an audio IF unit 44 and a video output format conversion unit 45.

The graphic engine unit 41 is a high-performance graphics engine for executing the graphics process such as filtering, screen synthesis, curve plotting and 3D display.

The video input format conversion unit 42 converts the signal format attributable to, for example, the color space of the video data inputted to the integrated circuit for video/audio processing 100 into a format suitable for the internal processing.

The imaging processing engine unit 43 executes the high-quality imaging processing on the still image and the dynamic image inputted from the digital camera 108, etc.

The audio IF unit 44 is an A/D converter, a D/A converter or the like for inputting/outputting the audio signal to and from a microphone or speaker, etc.

The video output format conversion unit 45 converts the signal format attributable to the color space of the output video signal into a format suitable for the LCD 107, etc.

The memory IF block 50 is an interface circuit for controlling the data transfer between the integrated circuit for video/audio processing 100 and an external memory such as the SDRAM 106 and the high-speed IF 105, and configured to include a memory scheduler 51, a buffer unit 52 and a built-in RAM 53.

The memory scheduler 51 is a scheduler having ports (sub-system IFs 51a to 51c) for inputting/outputting data in parallel to and from the processing blocks 10 to 40 and the high-speed IF 105, and in accordance with an instruction from the microcomputer block 10, secures a predetermined transfer band and guarantees the latency for each of the subsystem IFs 51a to 51c.

The buffer unit 52 is a high-speed buffer memory for relaying the data transfer with the SDRAM 106 and the memory scheduler 51.

The built-in RAM 53 is a data saving buffer memory for the memory scheduler 51 to guarantee the data transfer of a predetermined band for each of the subsystem IFs 51a to 51c.

Next, the operation of the integrated circuit for video/audio processing 100 having the above-mentioned configuration is explained with reference to FIGS. 4 to 6.

Figure 4:
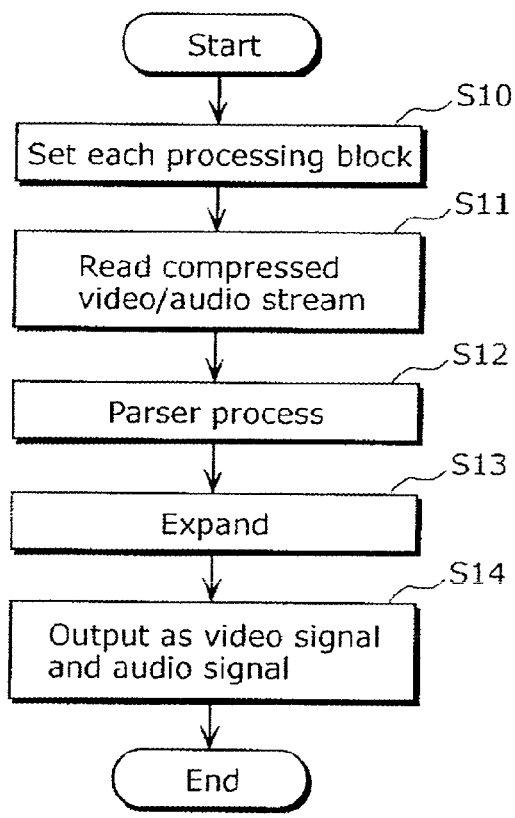
FIG. 4 is a flowchart showing the operation sequence of the integrated circuit for video/audio processing.

FIG. 4 is a flowchart showing the operation sequence of the integrated circuit for video/audio processing 100 in the case where the video signal and the audio signal are outputted after the compressed video/audio stream is read from the memory card 103 and decompressed. FIG. 5 is a diagram showing the related data flow. FIG. 6 is a diagram showing the manner of the processing in the processing blocks 20 to 40.

First, the microcomputer block 10 initializes the processing blocks 20 to 40 in accordance with the built-in block (S10 in FIG. 4). For example, the media processing block 20 is instructed to execute the decompression process based on the MPEG 4, the stream I/O block 30 to read the compressed video/audio streams stored in the memory card 103, and the AV IO block 40 to output the audio signal and to output the video signal to the LCD 107.

Figure 5:
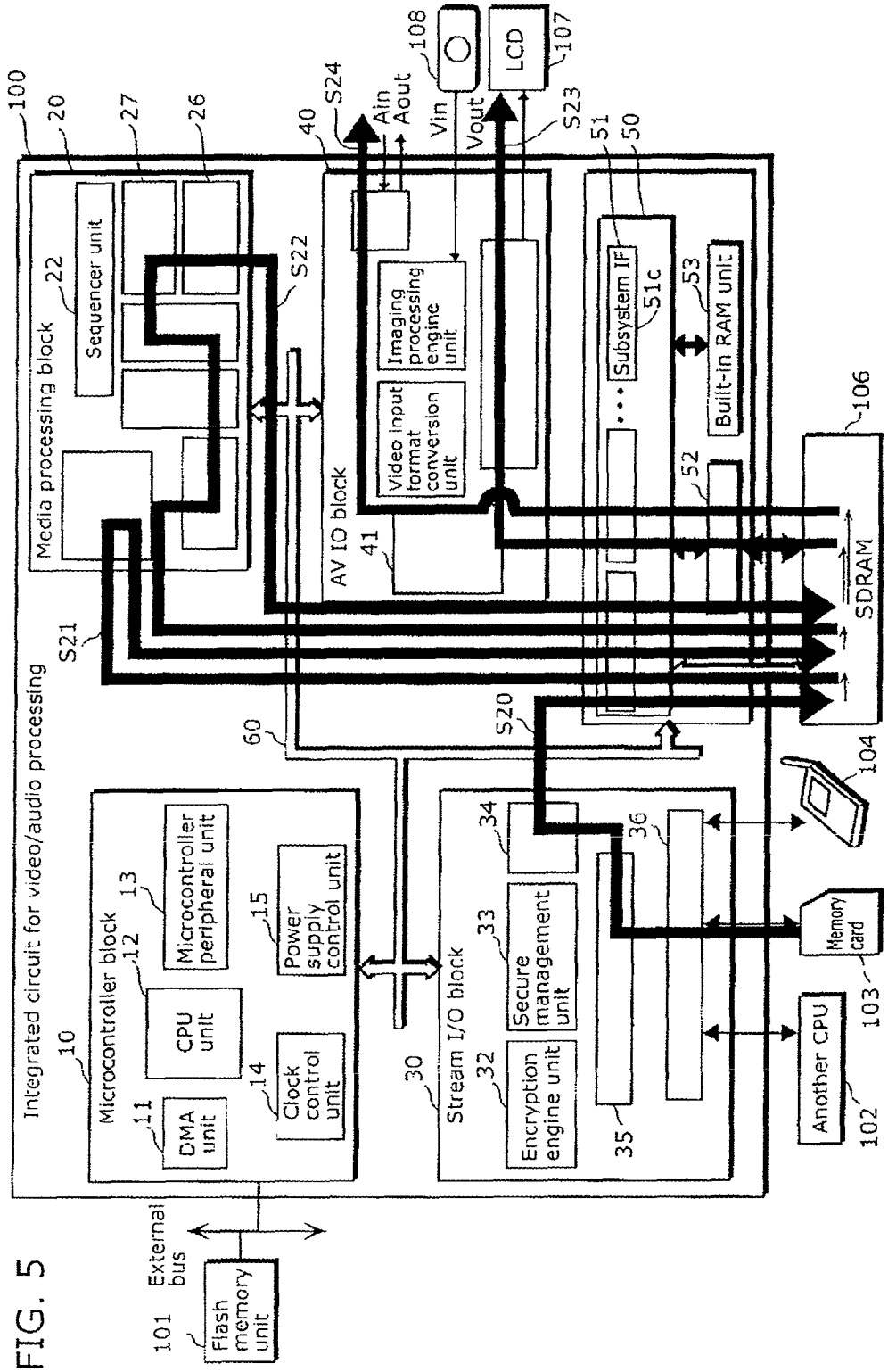
FIG. 5 is a diagram showing the data flow in the operation in FIG. 4.
Figure 6:
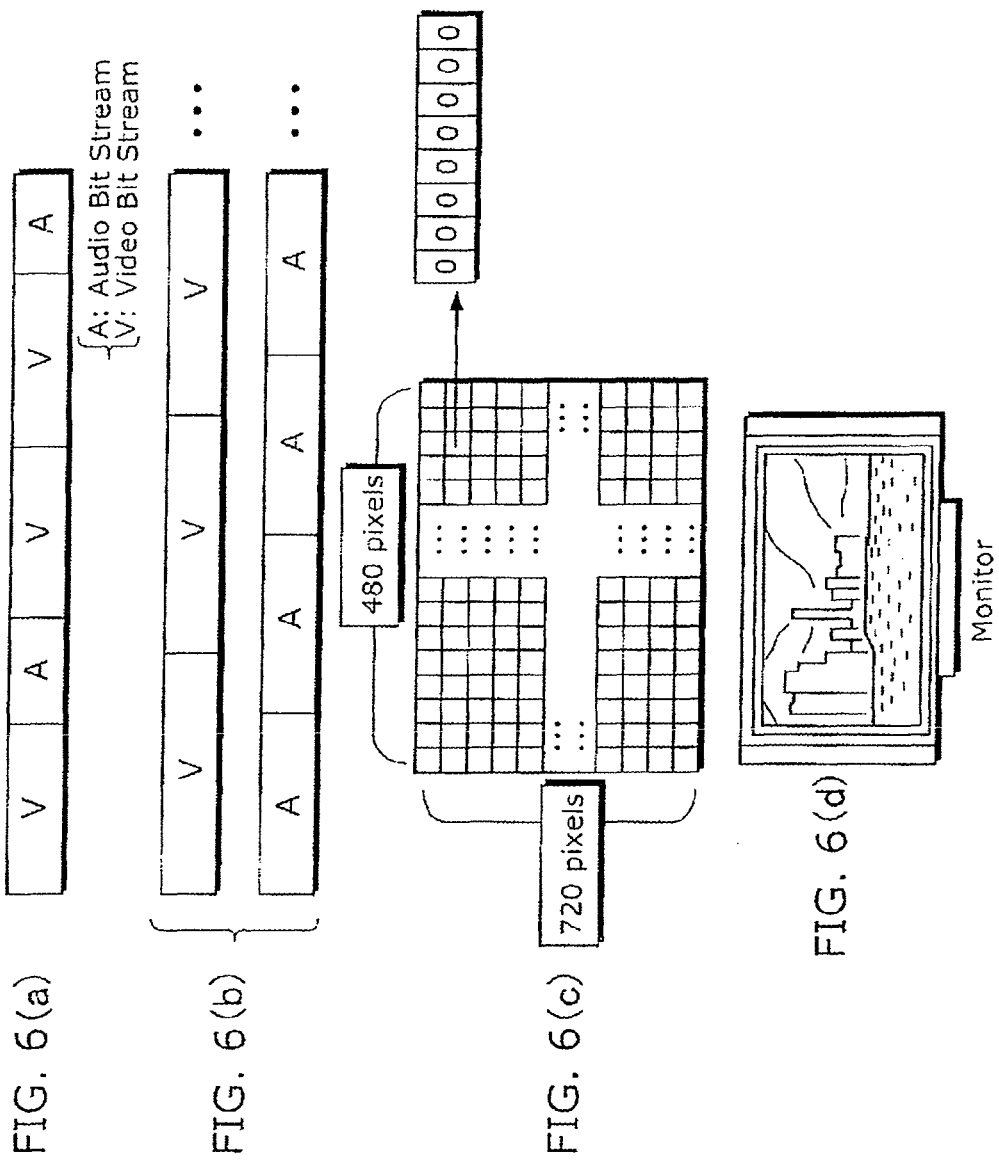
FIGS. 6(a) to 6(d) are diagrams showing the manner in which the process is executed in each processing block in the operation shown in FIG. 4.

Next, the stream I/O block 30 reads the compressed video/audio stream stored in the memory card 103, and stores it in the SDRAM 106 through the memory IF block 50 (S11 in FIG. 4, S20 in FIG. 5). This compressed video/audio stream, as shown in FIG. 6(a), for example, is a multiplexed structure of bit strings of an image and audio.

Then, the media processing block 20 reads the compressed video/audio stream stored in the SDRAM 106, and based on the header information thereof, executes the parser process and the like. Thus, the compressed video/audio stream is decompressed into a video stream and an audio stream as shown in FIG. 6(b), and each stream data demultiplexed is written back into the SDRAM 106 through the memory IF block 50 (S12 in FIG. 4, S21 in FIG. 5).

The media processing block 20 again reads the video stream and the audio stream from the SDRAM 106, and after decompression, the video data (for example, the video data expressed in 8 bits for each pixel) and the audio data (the audio data expressed in 16 bits/sample) shown in FIG. 6(c) are written back into the SDRAM 106 (S13 in FIG. 4, S22 in FIG. 5).

Finally, the AV IO block 40 reads the video stream and the audio stream from the SDRAM 106. As for the video stream, the format is changed to the REC656 format, etc. As for the audio stream, the D/A conversion, etc is carried out. After that, a video signal and an audio signal are outputted to the LCD 107 and the speaker, etc., respectively, as shown in FIG. 6(d) (S14 in FIG. 4, S23, S24 in FIG. 5).

Note that the process by each processing unit (S11 to S14 in FIG. 4) is executed by pipelining in units of packet, macro block, slice or picture, etc for the video stream, and in units of packet or frame, etc for the audio stream. In the process, the microcomputer block 10, the media processing block 20, the stream I/O block 30 and the AV IO block 40, if the packets, etc. of the video and audio streams are stored in the SDRAM 106, notifies the other blocks of the storage. As a result, each pipelining process is executed.

As described above, in the integrated circuit for video/audio processing 100 according to the present disclosure, the compressed video/audio stream supplied from an external device such as a memory card 103 is demultiplexed into a video stream and an audio stream, and after being decompressed, converted in format and outputted as a video signal and an audio signal. Specifically, the reproduction of the compressed video/audio stream stored in the external device becomes possible only with one LSI and an external memory (SDRAM 106).

This integrated circuit for video/audio processing 100 has a buffer memory for provisionally storing the video and audio data not for each processing block but a memory (SDRAM 106) shared by all the processing blocks. Thus, the memory size assigned to each processing block can be freely determined, and this integrated circuit for video/audio processing 100 can be used for various applications of different amounts of data generated or processing loads in each processing block. Also, since each block is not required to have an independent buffer memory, the whole chip size of this integrated circuit for video/audio processing 100 can be reduced.

Next, of all the integrated circuits for video/audio processing according to the present disclosure, the integrated circuit for video/audio processing suitable for server applications such as DTV and DVR is explained in more detail.

Figure 7:
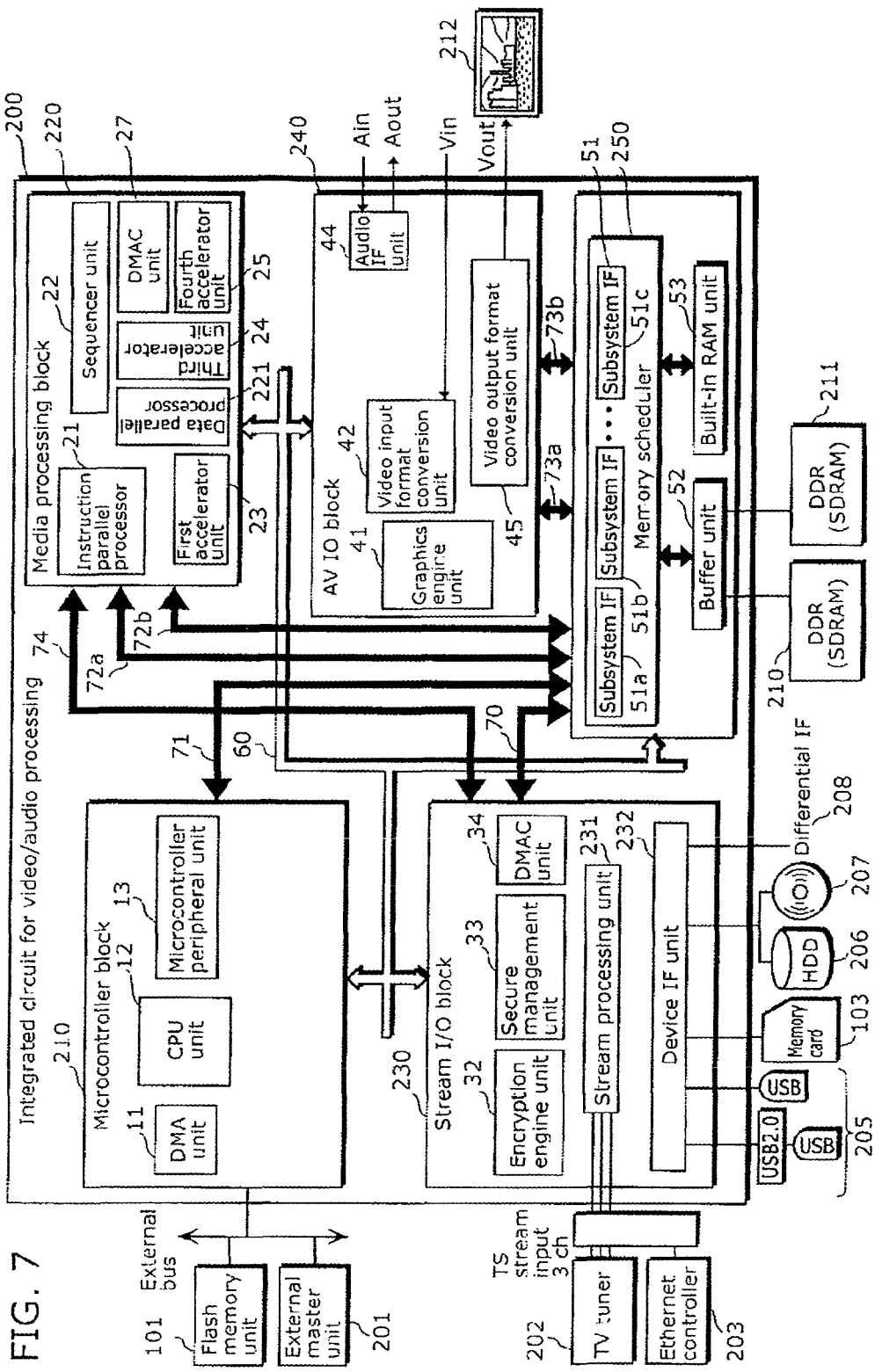
FIG. 7 is a function block diagram showing a detailed configuration of the integrated circuit for video/audio processing suitable for server applications.

FIG. 7 is a function block diagram showing a detailed configuration of an integrated circuit for video/audio processing 200 suitable for server applications.

This integrated circuit for video/audio processing 200 is a system LSI suitable for server video/audio devices requiring the connection with various peripheral devices and a great variety of media processing, and configured of a microcomputer block 210, a media processing block 220, a stream I/O block 230, an AV IO block 240 and a memory IF block 250. The processing blocks 210 to 250 basically have a similar configuration to the processing blocks 10 to 50 of the integrated circuit for video/audio processing 100. In the description that follows, similar component elements to those of the integrated circuit for video/audio processing 100 are designated by the same reference numerals, respectively, and not described again.

The microcomputer block 210 has the same configuration as the integrated circuit for video/audio processing 100 except that the clock control unit 14 and the power supply control unit 15 are removed from the microcomputer block 10. In server applications, these circuits of low power consumption are not required. The microcomputer block 210 is connected to an external master 201 constituting a main processor of a video/audio device through an external bus and can operate under the control of the external master 201.

The media processing block 220 has a configuration in which one accelerator of the media processing block 20 of the integrated circuit for video/audio processing 100 is replaced by a data parallel processor 221. The data parallel processor 221 is a SIMD (single instruction multiple data) processor for executing the arithmetic operation on plural pieces of data with one instruction and has 8 or 16 (of low or high parallelism) PEs (processor elements) executable in parallel. Though large in power consumption as compared with the accelerator, the data processing capacity is large, a wealth of types of arithmetic operation can be processed, and a great variety of media processing are possible. Specifically, the simultaneous coding/decoding corresponding to MPEG2&4, the decoding of the 2-ch video signal for HDTV, the unified processing of PS (program stream) and TS (transport stream) and the coding/decoding by MPEG4-AVC or the like coding/decoding process for multi-format applications become possible. Also, various conversions including the conversion from MPEG2 to MPEG4, the conversion from HD (high-definition video signal) to SD (standard definition video signal) and the conversion to low bit rate become possible. Further, the high image quality control corresponding to the display device for displaying an image becomes possible, thereby making it possible to meet the requirements for various media processing required for server applications.

The stream I/O block 230 has such a configuration that the stream processing unit 35 and the device IF unit 36 of the stream I/O block 30 in the integrated circuit for video/audio processing 100 are replaced by a stream processing unit 231 and a device IF unit 232 connectable to a greater variety of peripheral devices. The stream processing unit 231, in addition to the function of the stream processing unit 35 of the integrated circuit for video/audio processing 100, has the function of processing the streams from the TV tuner 202 and the Ethernet controller 203 connected to an external device to meet the requirements for the broadcasting and the network, etc. The device IF unit 232 is a collection of an interface for the memory card 103 and the USB 205, a disk drive interface for the hard disk 206 and the optical disk 207, a differential IF 208, etc.

The AV IO block 240 has a configuration of the AV IO block 40 of the integrated circuit for video/audio processing 100 lacking the imaging processing engine unit 43, and in place of the small-sized LCD 107, has the function of outputting a video signal to the large-sized LCD 212 compatible with SD/HD.

The memory IF block 250 has a similar function to the memory IF block 50 of the integrated circuit for video/audio processing 100, and as external memories 210, 211, has a high-speed bus connected to the SDRAM of DDR (double data rate) type as well as the normal SDRAM.

As described above, the integrated circuit for video/audio processing 200 according to the present disclosure is a system LSI suitable for server video/audio devices and has an interface circuit for a great variety of peripheral devices and a high-capacity media processor meeting the requirements for various data processing at the same time. The use of this integrated circuit for video/audio processing 200 can develop the server video/audio devices such as high-function DTV and DVR within a short period of time.

As described above, the integrated circuit for video/audio processing according to the present disclosure has five unique processing blocks, i.e. a basic architecture shared by all video/audio devices. Also, this integrated circuit has such a design freedom that it can be customized to a type suitable for mobile applications and server applications by changing the configuration of the processing blocks. As a result, the design resources for development of a specified device can be utilized for other devices.

Further, the collaborative operation of plural blocks provides the function of processing the streams inputted from the TV tuner, etc. and then in accordance with a designated codec scheme, generating the video and audio signals, thereby outputting the video signal to the external LCD and the sound to an external speaker. The memory IF block 250 secures the band width required for the related function with each block while at the same time guaranteeing the required access latency. As a result, the stream processing, the signal generating process and the output processing, etc. can be easily achieved without any deficiency of the required performance, i.e. without causing the frame drop-off or suspending the sound in realizing the TV functions.

Figure 8:
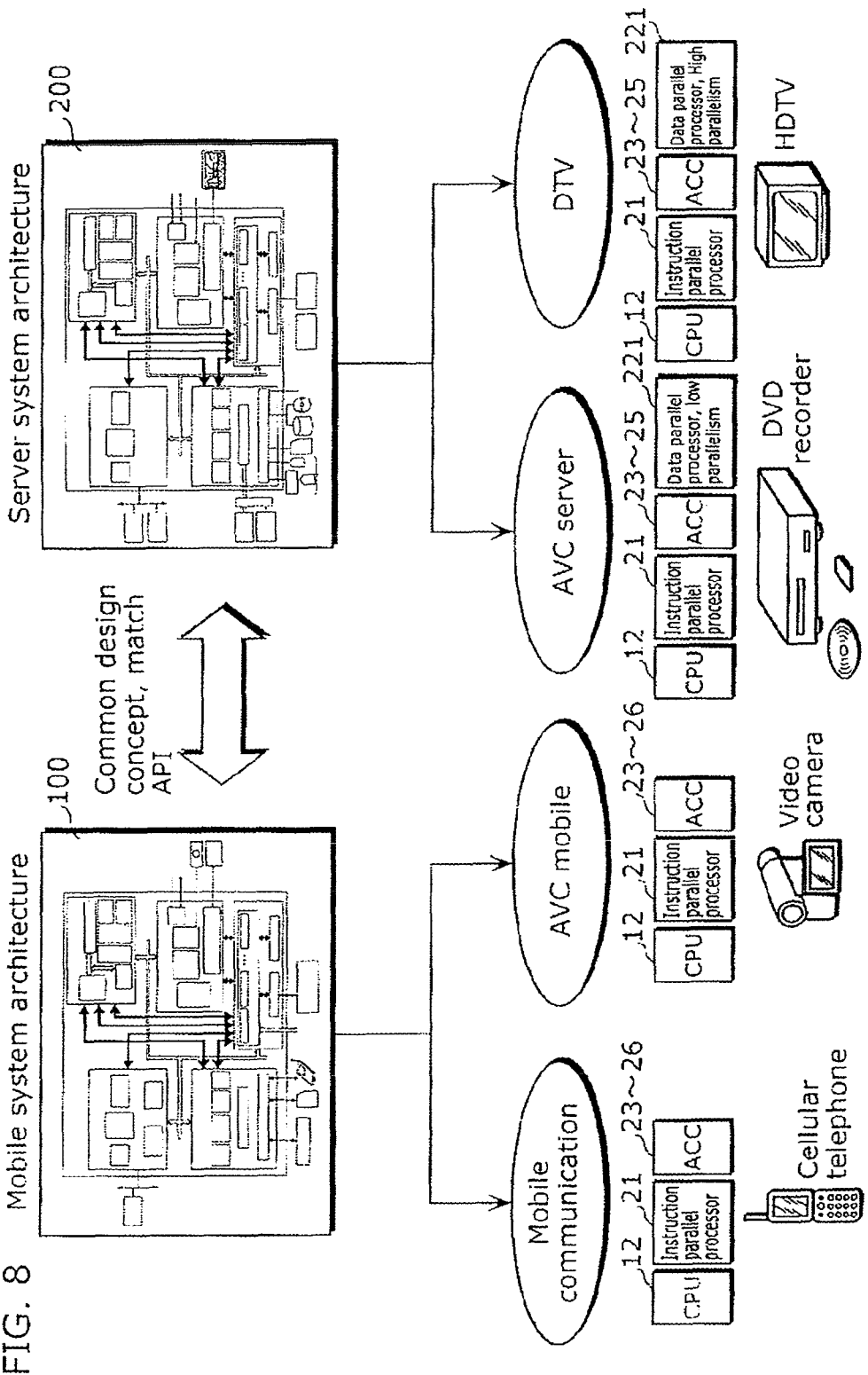
FIG. 8 is a diagram for explaining the features of the integrated circuit for video/audio processing.

FIG. 8 is a diagram for explaining the features of the integrated circuit for video/audio processing according to the present disclosure.

In this case, the integrated circuit for video/audio processing according to the present disclosure can be implemented as a system LSI having two types of architectures (mobile and server applications). These two types of integrated circuits for video/audio processing share a design concept and can be matched by API (application program interface). Further, the mobile integrated circuit for video/audio processing can be used as a system LSI for the mobile communication such as the portable telephone and an AVC mobile devices such as the video camera, while the server integrated circuit for video/audio processing can be used as a system LSI for the AVC server such as the BD recorder and DTV such as HDTV.

As described above, the integrated circuit for video/audio processing according to the present disclosure can be used as a system LSI for the video/audio devices roughly classified into two applications (mobile and server), or more specifically, four applications (DTV, AVC server, AVC mobile device and mobile communication), and the design resources can be used by these devices.

Next, among the integrated circuits for video/audio processing according to the present disclosure, the integrated circuit for video/audio processing with an improved video processing performance (especially, the video recording process executed in parallel to the reproduction) is explained in more detail.

Figure 9:
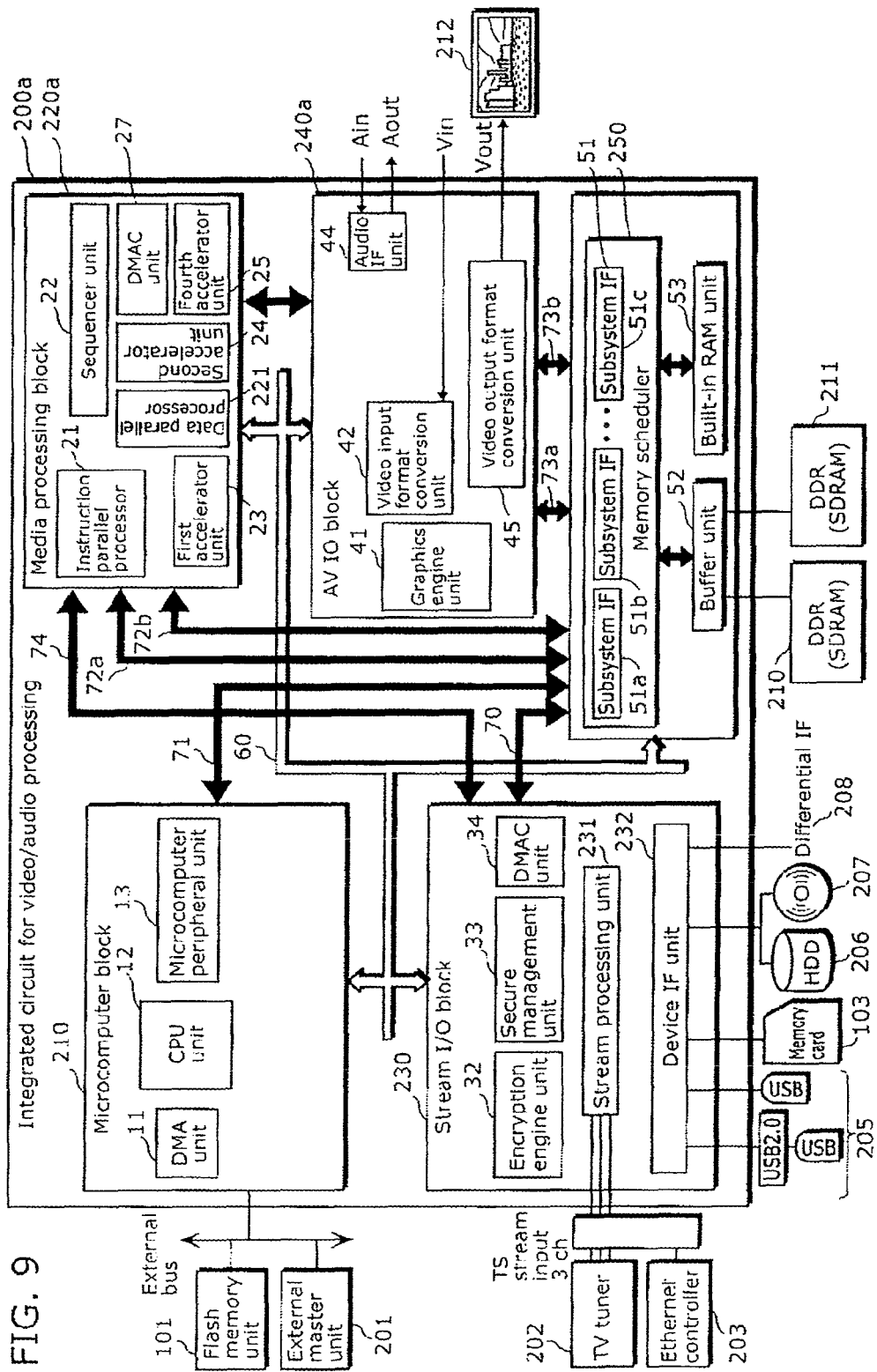
FIG. 9 is a function block diagram showing a detailed configuration of the integrated circuit for video/audio processing having an improved video processing performance.

FIG. 9 is a function block diagram showing a detailed configuration of the integrated circuit for video/audio processing 200a with an improved video processing performance.

The integrated circuit for video/audio processing 200a is a system LSI configured to improve the video processing performance in such an application as video recording with SD while viewing a high definition broadcast program (HD) or time-shifted reproduction of the SD image, and configured of a microcomputer block 210, a media processing block 220a, a stream I/O block 230, an AV IO block 240a and a memory IF block 250.

The processing blocks 210, 220a, 230, 240a, 250 basically have a similar configuration to the processing blocks 210 to 250 of the integrated circuit for video/audio processing 200. This integrated circuit for video/audio processing 200a has the feature that a data bus 75 for transmitting a comparatively small amount of field feature information extracted from the video stream connects the media processing block 220a and the AV IO block 240a. In the description that follows, the component elements similar to those of the integrated circuit for video/audio processing 200 are designated by the same reference numerals, respectively, and not described any more.

The media processing block 220a is a high-speed DSP succeeding to the feature of the media processing blocks 20, 220 described above, in which the video/audio/voice data read through the data buses 72a, 72b from the SDRAM 210, 211 are compressed/decompressed according to the MPEG standard, etc. In an application for recording by converting the resolution to SD while viewing a high definition (HD) broadcast program, for example, the instruction parallel processor 21 and/or the data parallel processor 221 concurrently executes the process of demultiplexing and decompressing the compressed HD video/audio multiplex stream to be viewed and the process of compression/multiplexing to obtain the compressed SD video/audio multiplex stream to be recorded, and each processing result is written back into the SDRAM 210, 211.

In the AV IO block 240a, the HD video data written back into the SDRAM 210, 211 as the result of the demultiplexing/decompression process by the media processing block 220a are acquired through the buses 73a, 73b, and outputted to the large-sized LCD 212, while at the same time the SD video data obtained by converting the resolution of the HD video data is written back into the SDRAM 210, 211. The field feature information (such as the in-field total information or the inter-field time difference information) known in the particular process is fed back to the media processing block 220a through the data bus 75.

This resolution conversion process is executed by the video output format conversion unit 45 of the AV IO block 240a, for example. The video output format conversion unit 45, as described above, has the function of converting the signal format attributable to the color space, etc. of the outputted video signal into a format suitable for the video output device. The down sampling and the decimation filter function constituting specific functions thereof can be used for the resolution conversion process.

Referring to this field feature information, the media processing block 220a again determines the field generating a scene change and the frequency of the scene change. Based on this determination, the frame after scene change is determined as I picture, for example. Also, during the period when the scene often changes, the compression ratio is increased as compared with the other periods, and thus equalizing the data amount after compression, the SD image data is compressed into a SD video stream. Further, by the multiplexing process, the compressed SD video/audio multiplex stream is generated, and the compressed SD video/audio multiplex stream thus generated is written back into the SDRAM 210, 211.

Next, the operation of the integrated circuit for video/audio processing 200a having the aforementioned configuration is explained with reference to FIGS. 10 to 12.

Figure 10:
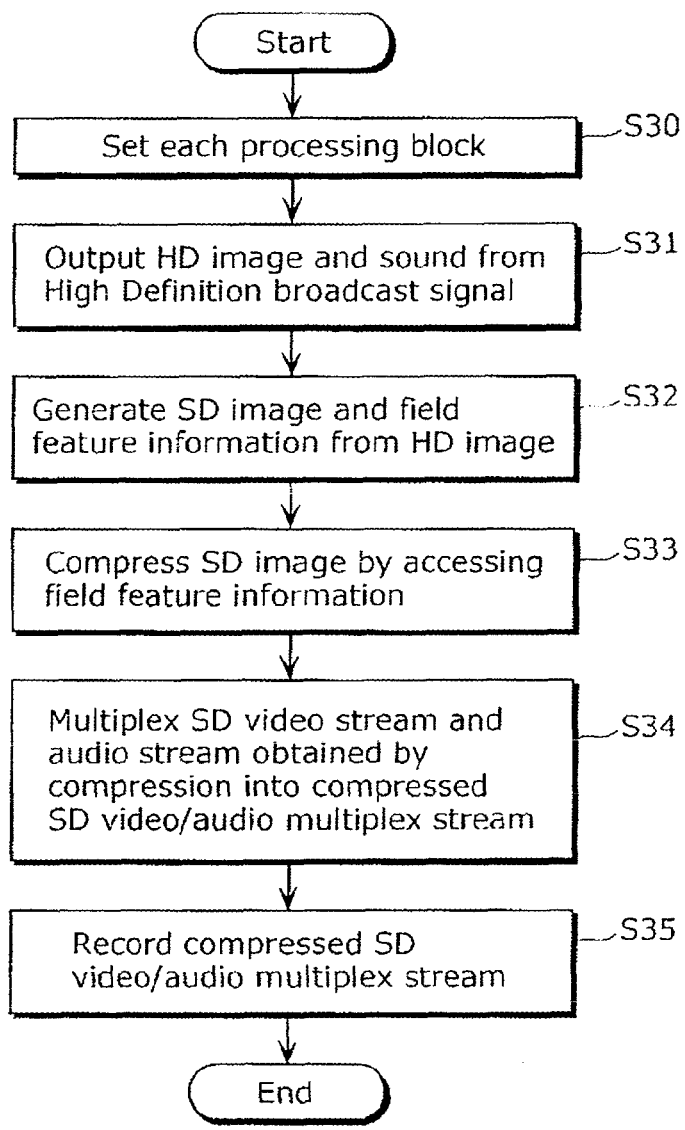
FIG. 10 is a flowchart showing the operation sequence of the integrated circuit for video/audio processing.

FIG. 10 is a flowchart showing the operation sequence of the integrated circuit for video/audio processing 200a in the case where the compressed HD video/audio multiplex stream constituting the high definition broadcast signal is read from the TV tuner 202, and while being outputted as a video signal and an audio signal, the resolution thereof is converted to the SD image and recorded.

Figure 11:
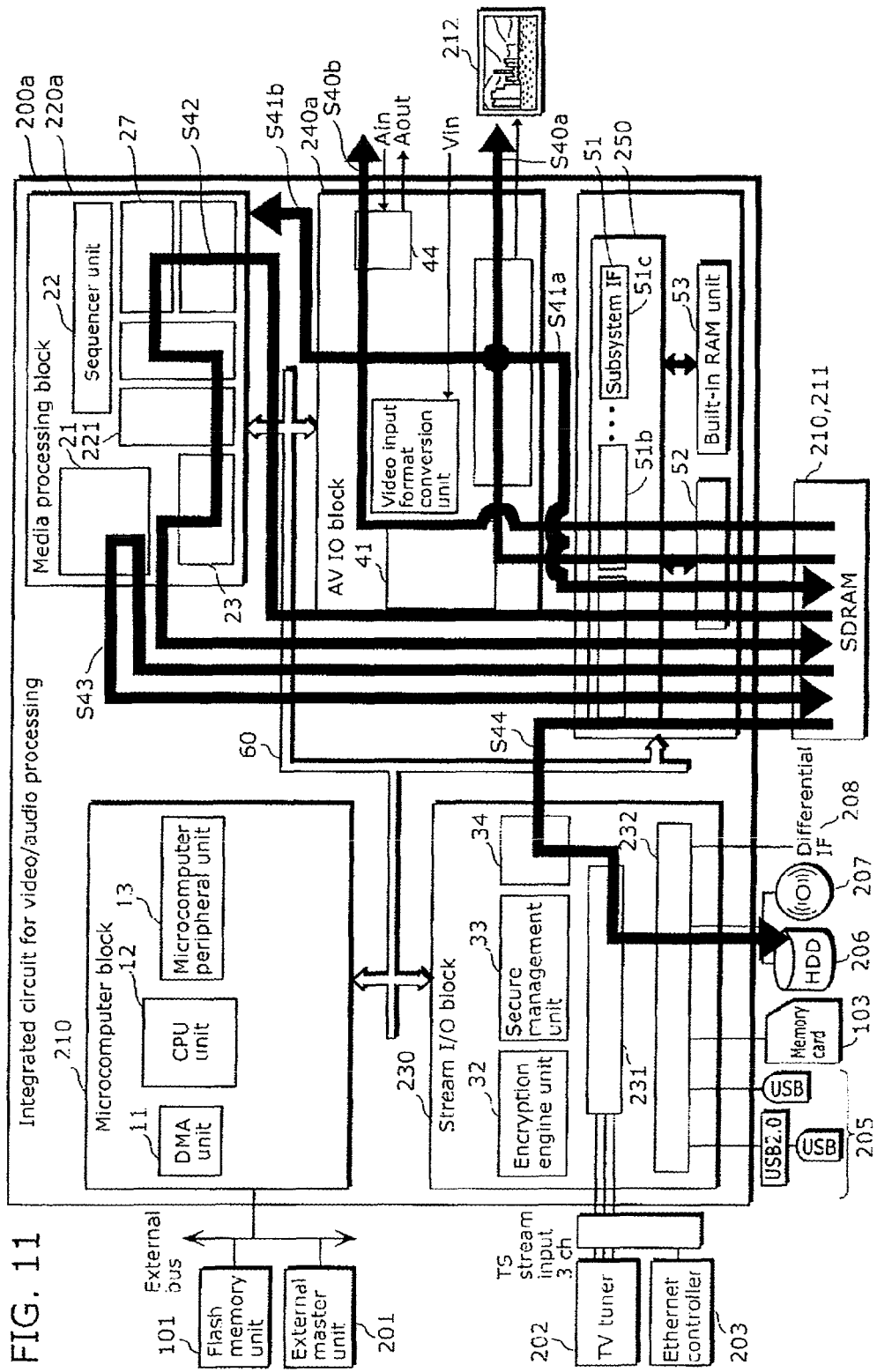
FIG. 11 is a diagram showing the data flow in the operation shown in FIG. 10.

FIG. 11 is a diagram showing the main data flow involved.

FIG. 12 is a diagram showing the contents of the processing by the processing blocks 220a, 240a.

First, the microcomputer block 10 initializes the processing blocks 220a, 230, 240a in accordance with a built-in program (S30 in FIG. 10). For example, instructions for the decompression process (HD) based on MPEG4 and the compression process (SD) based on MPEG2 are given to the media processing block 220a, and the stream I/O block 230 is instructed to acquire the compressed HD video/audio multiplex stream from the TV tuner 202 and to record the compressed SD video/audio multiplex stream in the HDD 206. Then, an instruction is given to the AV IO block 240a to output the audio signal and to output the video signal to the large LCD 212 and to convert the resolution from the HD image to the SD image.

Next, the stream I/O block 230 reads the compressed HD video/audio multiplex stream from the TV tuner 202, and the media processing block 220a, based on the header information from the compressed HD video/audio multiplex stream, executes the parser process, etc. thereby to demultiplex the stream into the video stream and the audio stream. Further, after decompressing the video and audio streams, the resultant video data and audio data are written back to the SDRAM 210, 211.

The operation described above is basically identical to the operation of the integrated circuit for video/audio processing 100 (see FIGS. 4, 5), the difference being whether the image resolution and the compressed video/audio multiplex stream are obtained from the memory card or the TV tuner. The data flow up to this stage is not shown in FIG. 11.

Then, the AV IO block 240 reads the HD video data and audio data from the SDRAM 210, 211, and as shown in FIG. 12(b), outputs them to the large-sized LCD 212 and the speaker, etc. (S31 in FIG. 10, and S40a, S40b in FIG. 11).

In parallel to the output of this HD image, the SD video data obtained by resolution conversion of the HD image as shown in FIG. 12(a) is written back by the AV IO block 240 into the SDRAM 210, 211, while at the same time generating the field feature information including the in-field total information (indicating the brightness of the whole field) and the inter-field difference information (indicating the brightness difference with the immediately preceding field) known during the process. This field feature information is stored as data corresponding to the field of the SD video data in a small buffer memory, not shown, in the AV IO block 240a, for example, and through the data bus 75, supplied as a reference to the media processing block 220a (S32 in FIG. 10, S41a, S41b in FIG. 11).

After that, the media processing block 220a reads the SD video data and the audio data from the SDRAM 210, 211, while at the same time determining the I picture by accessing the field feature information through the data bus 75. Further, while changing the compression ratio dynamically, the particular SD video data and the audio data are compressed, so that the SD video stream and the audio stream are generated and written back to the SDRAM 210, 211 (S33 in FIG. 10, S42 in FIG. 11).

The media processing block 220a again reads the SD video stream and the audio stream from the SDRAM 210, 211 and by multiplexing them, writes back the compressed SD video/audio multiplex stream generated by the multiplexing process into the SDRAM 210, 211 (S34 in FIG. 10, S43 in FIG. 11).

Finally, the stream I/O block 230 reads the compressed SD video/audio multiplex stream from the SDRAM 210, 211 and records them in the HDD 206 (S35 in FIG. 10, S44 in FIG. 11).

This compressed video/audio multiplex stream may be recorded in the HDD 206 as a high definition broadcast video recording or may be read after the lapse of a predetermined time and reproduced in time shift by the picture-in-picture display at the same time as the high definition broadcasting as shown in FIG. 12(b). In the latter case, the step of reproducing the compressed SD video/audio multiplex stream recorded in the HDD 206 is further added to the operation shown in FIG. 10.

In a series of the processes (S31 to S35 in FIG. 10) executed by the processing blocks described above, two or three streams including the stream of the broadcast program viewed, the stream recorded and, in the time-shifted reproduction, the stream for the time-shifted reproduction are concurrently processed by pipelining in well-known processing units such as packet, macro block, slice, picture and frame.

As described above, with the integrated circuit for video/audio processing 200a according to the present disclosure, the media processing block 220a accesses, through the data bus 75, the field feature information known in the AV IO block 240a and determines the I picture for compression of the recorded image while at the same time dynamically adjusting the compression ratio. As a result, the integrated circuit for video/audio processing 200a can obtain a high speed performance by avoiding the duplicate cost for acquiring the field feature information while at the same time achieving a satisfactory tradeoff between image quality and data amount.

The data bus 75, as described above, transmits a comparatively small amount of field feature information only between the media processing block 220a and the AV IO block 240a, and therefore the independence of the application program is only slightly affected by each processing block. Also, the mounting area occupying the integrated circuit for video/audio processing is small.

The superior effect obtained by supplying the field feature information to the media processing block 220a from the AV IO block 240a is explained above taking the video recording of the high definition broadcast as a conspicuous example. As another example, by supplying a similar field feature information to the media processing block 20 from the AV IO block 40 in the integrated circuit for video/audio processing 100 (see FIG. 3), a similar effect can be achieved in the video recording of the video image acquired from an external device such as a digital camera as well as the video recording of the broadcast.

Next, among the integrated circuits for video/audio processing according to the present disclosure, an integrated circuit for video/audio processing suitably shared by the video processing of the broadcast system and the accumulation system is explained in more detail. The broadcast system is defined as a process for a broadcast program obtained by the TV tuner, internet, etc., and the accumulation system as a process for a program accumulated in a recording medium such as HDD, DVD or memory card.

Figure 13:
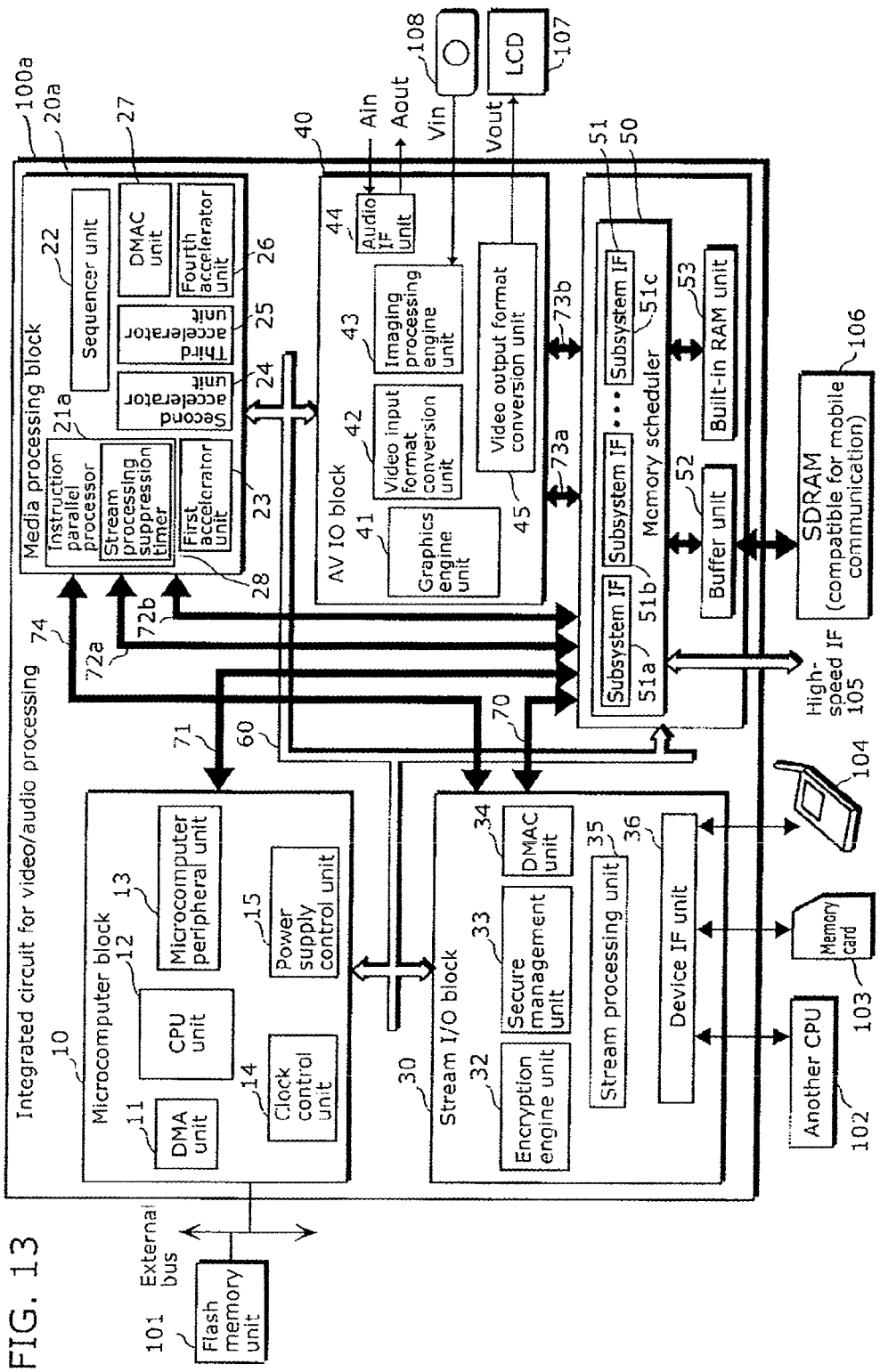
FIG. 13 is a function block diagram showing a detailed configuration of the integrated circuit for video/audio processing suitable for the stream processing.

FIG. 13 is a function block diagram showing a detailed configuration of the integrated circuit for video/audio processing 100a suitably shared by the video processing for the broadcast system and the accumulation system.

This integrated circuit for video/audio processing 100a is a system LSI having the function of processing the broadcast system (the reproduction of a broadcast program obtained from the TV tuner, for example) and the function of processing the accumulation system (the reproduction of a program accumulated in the HDD, for example), and configured of a microcomputer block 10, a media processing block 20a, a stream I/O block 30, an AV IO block 40 and a memory IF block 50.

This integrated circuit for video/audio processing 100a has the feature that the media processing block 20a includes a virtual multiprocessor 21a having a stream processing suppression timer 28. The other component elements of the configuration are basically similar to those of the integrated circuit for video/audio processing 100.

Generally, the virtual multiprocessor (VMP) is a kind of the instruction parallel processor performing the functions of plural logical processors (LP) by time division (one LP is really a context set in a register group of physical processors (PP)). By controlling the frequency of the time slot (TS) assigned to each LP, the load balance can be maintained between the applications executed by each LP. A typical example of the configuration and operation of the VMP is disclosed in detail in Japanese Laid-Open Patent Application No. 2003-271399 and therefore not described in detail below.

The same component elements as those of the integrated circuit for video/audio processing 100 are designated by the same reference numerals, respectively, and not described any more.

The media processing block 20a, like the media processing block 20 of the integrated circuit for video/audio processing 100 described above, is a circuit block for multiplexing/demultiplexing the compressed video/audio multiplex stream and compressing/decompressing the video/audio data, and includes a virtual multiprocessor 21a implemented on the instruction parallel processor 21.

The virtual multiprocessor 21a multiplexes/demultiplexes the stream, compresses/decompresses the video signal and compresses/decompresses the audio signal using, for example, three LPs (stream LP, video LP and audio LP) for each compressed video/audio multiplex stream to be recorded or reproduced.

Each LP is assigned TS in accordance with the characteristics of the stream, the image and the audio, respectively. For example, taking the arithmetic operation amount into consideration, more TSs are assigned to video LP than to audio LP. Also, in order to prevent the failure to pick up (what is called stream drop-off) the broadcast signal, the stream LP is configured as an event driven LP assigned TS for each packet received or an event driven LP with timer suppression with TS assignment prohibited within a predetermined time under the control of a stream processing suppression timer 28.

Figure 14:
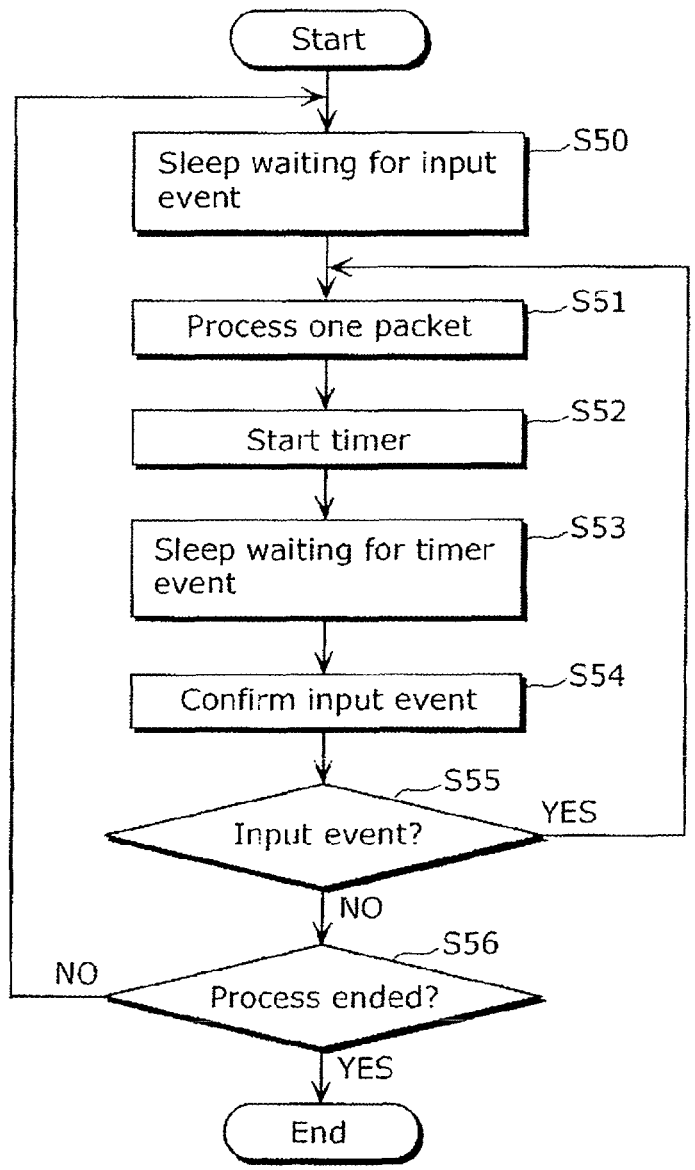
FIG. 14 is a flowchart showing the operation sequence of a virtual multiprocessor for the stream processing.

It is apparent that this TS assignment to each LP maintains a satisfactory load balance between the processes while at the same time preventing the stream drop-off. With reference to FIGS. 14 and 15, an explanation is made below about the fact that the stream LP configured as an event driven LP with timer suppression is useful for the sharing of the video processing (especially the reproduction process) between the broadcast system and the accumulation system.

FIG. 14 is a flowchart showing the operation sequence of the event driven LP with timer suppression for sharing the execution of the stream processing for the broadcast system and the accumulation system.

FIG. 15 is a diagram showing the timing of generation of each event and the TS for LP operation of the stream, the video and the audio signals for the processing of the stream of the broadcast system and the processing of the stream of the accumulation system. The right direction in the drawing corresponds to the time lapse, the band the TS arrangement, and the character therein the LP operating at a TS ("stream", "video" and "audio" indicate the stream LP, the video LP and the audio LP, respectively, while the blank indicates the absence of LP in operation).

First, the broadcast system is explained with reference to FIGS. 14, 15(a) on the assumption that a packet is acquired from a TV tuner and an input event is generated for each time of InFreq.

First, the stream LP asleep waiting for an input event (S50) wakes up at the input event of the Nth packet and starts the operation at the first TS. Upon completion of the processing of the packet at time StTime(N) (S51), a timer of a shorter time than Infreq-StTime(N) is started (S52) and the sleep waiting for a timer event is entered (S53). The second and third TSs are assigned to the video and audio LPs, respectively.

The stream LP wakes up by a timer event generated during the fourth TS. Once the operation is started at the fifth TS, the input event is confirmed (S54), and recognizing the input event of the (N+1)th packet (YES in S55), the particular packet is processed (S51). A similar operation is subsequently repeated.

As one specific example, consider a case in which the operation clock frequency of the virtual multiprocessor is 243 MHz and the stream is 70 Mbps. The number of packets per second is 70 [Mbps]/(8 [bits]×188 [bytes/Packet])≅46543 [packets/sec] and the packet processing period InFreq is 243 [Mclock/sec]/46543 [Packets/sec]≅5221 [clock/packet].

As described above, in the case of the broadcast system, the input events are generated at comparatively long intervals so that the processing of the stream LP is limited, with the result that a satisfactory load balance is maintained between the stream, the video and audio LPs.

Next, the accumulation system is explained with reference to FIGS. 14, 15(b) on the assumption that during the processing of a packet, a succeeding packet is acquired from the HDD to generate the next input event and desirably processed the same time InFreq later as in the broadcast system.

First, the stream LP asleep waiting for an input event (S50) wakes up at the input event of the Nth packet and starts operation at the first TS. Once the processing of this packet is finished at time StTime(N) (S51), the timer of time InFreq-StTime(N) is started (S52), and the sleep waiting for a timer event is entered (S53). The stream LP continues to sleep without waking up at the input event of the (N+1)th packet generated during the first TS (thick dotted line starting from the (N+1)th input event in FIG. 15(b)).

As long as the stream LP fails to process the (N+1)th packet, the stream I/O block 30 having no stream buffer cannot read the succeeding packet and the process of reading the (N+2)th packet is postponed. The second and third TSs are assigned to the video and audio LPs, respectively.

The stream LP wakes up at a timer event occurring during the fourth TS. Once the operation is started at the fifth TS, the input event is confirmed (S54) and recognizing the input event of the (N+1)th packet (YES in S55), the particular packet is processed (S51), after which the sleep waiting for the timer event is entered (S52, S53). The stream LP continues to sleep without waking up at the input event of the (N+2)th packet occurring during the fifth TS (thick dotted line starting from the (N+2)th input event in FIG. 15(b)). After that, a similar operation is repeated.

As described above, in the case of the accumulation system, the input event itself can occur at comparatively short intervals. Even in such a case, the processing of the stream LP is limited by the sleep waiting for the timer event, with the result that a satisfactory load balance is maintained between the LPs of the stream, the video and audio signals.

In the case where the stream LP fails to sleep waiting for the timer event in the accumulation system, the more streams are processed, the more input events occur, with the result that TS is excessively assigned to the stream LP while the video LP and the audio LP fail to be assigned the required amount of TS, thereby disrupting the video/audio processing.

As described above, the integrated circuit for video/audio processing 100a executes the stream processing by the event driven LP with timer suppression of the virtual multiprocessor 21a in the media processing block 20a. This process is shared by both the broadcast system and the accumulation system to which streams may be inputted excessively, so that the excessive execution of the stream processing is autonomously suppressed thereby to prevent the disruption of the video/audio processing while at the same time eliminating the need to manage the upper limit of the stream amount sent to the media processing block 20a in the stream I/O block 30. As an overall result, the independence and the simplicity of the application program for each processing block are improved, thereby contributing to the promotion of the utilization of the design resources.

The stream processing by the event driven LP with timer suppression is applicable also to a case in which two channels are concurrently processed.

FIG. 16 is a diagram showing the timing of occurrence of each event and the TS at which the LPs of the stream, video and audio signals operate with reference to a case (a) in which the streams of two broadcast systems are processed, a case (b) in which the streams of a broadcast system and an accumulation system are processed, and a case (c) in which the streams of two accumulation systems are processed. Time elapses rightward in the drawing, the band shows a TS string and the characters therein show the LPs operating at TS (characters S, V and A indicate the stream LP, the video LP, the audio LP, respectively, and the blank the absence of LP in operation. Also, numerals 0, 1 discriminate the channels).

As shown in the drawing, in accordance with whether each stream is associated with the broadcast or accumulation system, events occur at the timing explained above (see FIGS. 15(a), (b)). In the accumulation system, the wake-up by the input event is postponed by the sleep waiting for a timer event with the result that the excessive execution of the stream processing is prevented as in the aforementioned case. As described above, the stream processing by the event driven LP with timer suppression exhibits the effect of maintaining a satisfactory load balance of the stream, the video and audio processing even in the case where two channels are processed concurrently.

The integrated circuit for video/audio processing according to the present disclosure is explained above with reference to an embodiment. Nevertheless, the present disclosure is not limited to this embodiment.

The integrated circuit for video/audio processing according to the present disclosure is classified into two systems including the mobile system and the server system, to which classification the present disclosure is not limited. In an application to a video/audio device such as a notebook-sized personal computer with the AV function requiring a lower power consumption and a high-resolution display, for example, an integrated circuit for video/audio processing having combined functions of the clock control unit 14, the power supply control unit 15 and the data parallel processor 21 can be employed.

The integrated circuit for video/audio processing suitable for the aforementioned four applications basically may have a common architecture shown in FIG. 1, and all the blocks are not required to be configured of exactly the same circuit. In the case where one of the devices for the aforementioned four applications is designated as a first device and another one as a second device, for example, the integrated circuit for video/audio processing for the first device and the integrated circuit for video/audio processing for the second device are required to share at least one of the features that (1) at least a part of the instruction set of the CPU is compatible, (2) at least a part of the instruction set of the instruction parallel processor is compatible, (3) the core of the CPU has the same logic connection (soft macro), (4) the core of the instruction parallel processor has the same logic connection, (5) the core of the CPU has the same mask layout (hard macro), and (6) the control registers (the registers for controlling the blocks) of each block on the memory map of the CPU have the same address or the area of the external memory 9 used by the various processes is shared. This sharing function makes possible the utilization of the application programs with the processing blocks as units or the utilization of the system LSI on the fabrication process and the like, thereby improving the development efficiency as a whole.

Also, according to this embodiment, the memory shared by the processing blocks may be built in the system LSI instead of being externally connected to the system LSI.

INDUSTRIAL APPLICABILITY

The present disclosure can be used as a system LSI for the devices dealing with the video and audio signals, especially, as a system LSI of the video/audio devices used with the AVC servers such as DTV or DVD recorder, the AVC mobile devices such as the digital camera and the mobile communication devices such as the portable telephone.

What is claimed:

1. An integrated circuit for video/audio processing that processes a video and audio signal, comprising:
    an I/O processing block executing an operation including I/O processes; and
    a secondary-I/O processing block executing an operation including I/O processes fewer than the I/O processes executed by said I/O processing block,
    wherein each of said I/O processing block and said secondary-I/O processing block is defined into a real-time processing part for executing real-time processes and a secondary-real-time processing part for executingsecondary-real-time processes;
    wherein said real-time processing part of said I/O processing block and said secondary-I/O processing block process a video and audio signal,
    wherein said secondary-I/O processing block is for multipurpose processing and operable to stop at least one of a power and a clock to be supplied thereto independently of said I/O processing block,
    wherein said secondary-real-time processes executed by said secondary-real-time processing part are fewer than said real-time processes executed by said real-time processing part,
    wherein
        a first block is configured with said secondary-real-time processing part of said secondary-I/O processing block;
        a second block is configured with said real-time processing part of said secondary-I/O processing block;
        a third block is configured with said secondary-real-time processing part of said I/O processing block; and
        a fourth block executing a real-time I/O process is configured with said real-time processing part of said I/O processing block, and
    wherein said first block and said second block that both execute a secondary-I/O process are operable to stop at least one of power and a clock from being supplied thereto independently of said third block and said fourth block.

2. The integrated circuit for video/audio processing according to claim 1, further comprising:
    a fifth block accessing an external memory,
    wherein each of said second, third and fourth blocks is coupled to said fifth block.

3. The integrated circuit for video/audio processing according to claim 2, wherein
    said second block, said third block and said fourth block are connected to said fifth block by plural data buses, and
    when data is exchanged between any two of said second block, said third block and said fourth block, said data is exchanged therebetween through said fifth block by using said external memory.

4. The integrated circuit for video/audio processing according to claim 2, wherein
    said first block includes a microcomputer including a central processor unit (CPU),
    said third block includes a stream input/output operable to receive/output a video and audio stream to/from an external device,
    said second block includes a media processor operable to execute a media processing including at least one of compression and decompression of the video and audio stream input to said stream input/output or output from said stream input/output,
    said fourth block includes an AV input/output operable to convert the video and audio stream subjected to the media processing in said media processor and output the video and audio stream to a first external apparatus, or acquire the video and audio signal from a second external apparatus and convert the video and audio signal into a video and audio stream subjected to the media processing in said media processor, and
    said fifth block includes a memory interface operable to control a data transfer between said external memory and one of said stream input/output, said media processor and said AV input/output.

* * * * *